United States Patent
Kim et al.

(10) Patent No.: US 9,098,480 B2
(45) Date of Patent: Aug. 4, 2015

(54) MOBILE TERMINAL AND METHOD FOR CONTROLLING THE MOBILE TERMINAL TO DISPLAY BOOKMARK ICONS FOR AN E-BOOK

(75) Inventors: Miyoung Kim, Pocheon-si (KR); Yoomee Song, Seoul (KR); Minjeong Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 699 days.

(21) Appl. No.: 13/282,401

(22) Filed: Oct. 26, 2011

(65) Prior Publication Data

US 2012/0240075 A1    Sep. 20, 2012

(30) Foreign Application Priority Data

Mar. 16, 2011 (KR) .................. 10-2011-0023294

(51) Int. Cl.
G06F 3/048 (2013.01)
G06F 17/24 (2006.01)
G06F 3/0481 (2013.01)
G06F 3/0483 (2013.01)
G06F 3/0488 (2013.01)
G06F 17/30 (2006.01)

(52) U.S. Cl.
CPC ............ *G06F 17/241* (2013.01); *G06F 3/0481* (2013.01); *G06F 3/0483* (2013.01); *G06F 3/0488* (2013.01); *G06F 3/04886* (2013.01); *G06F 17/30884* (2013.01)

(58) Field of Classification Search
CPC ...................................... G06F 3/048
USPC ............................... 715/776, 805
See application file for complete search history.

(56) References Cited

U.S. PATENT DOCUMENTS

| | | | | |
|---|---|---|---|---|
| 5,463,725 A | * | 10/1995 | Henckel et al. | ............... 715/776 |
| 5,893,132 A | * | 4/1999 | Huffman et al. | .............. 715/201 |
| 6,992,687 B1 | * | 1/2006 | Baird et al. | .................... 715/805 |
| 7,081,882 B2 | * | 7/2006 | Sowden et al. | ............... 345/156 |
| 2003/0009459 A1 | * | 1/2003 | Chastain et al. | .................. 707/7 |
| 2003/0210226 A1 | * | 11/2003 | Ho et al. | ....................... 345/156 |
| 2004/0201633 A1 | | 10/2004 | Barsness et al. | |

(Continued)

FOREIGN PATENT DOCUMENTS

CN            1643483          7/2005
WO         2010/112951       10/2010

OTHER PUBLICATIONS

The State Intellectual Property Office of the People's Republic of China Application Serial No. 201210049464.2, Office Action dated Sep. 23, 2014, 9 pages.
Tiersten, "Kindle 3 firmware files—MobileRead Forums", Oct. 23, 2010, XP55037231.

(Continued)

*Primary Examiner* — Matthew Ell
(74) *Attorney, Agent, or Firm* — Lee, Hong, Degerman, Kang & Waimey

(57) ABSTRACT

A mobile terminal is provided that includes a touch screen configured to display an e-book including one or more pages. The mobile terminal further includes a controller configured to set a bookmark on a selected page of the one or more pages when a touch input applied in a touch direction from an inner portion of the selected page toward an outer portion of the selected page is detected. The controller is further configured to generate and display a first type bookmark icon or a second type bookmark icon corresponding to the bookmark set on the selected page.

22 Claims, 17 Drawing Sheets

(56) References Cited

U.S. PATENT DOCUMENTS

2012/0216101 A1* 8/2012 Yonemoto .................... 715/206
2012/0290964 A1* 11/2012 Lee et al. .................... 715/776

OTHER PUBLICATIONS

Sony, "Daily Reader TM User's Guide PRS-900", Jan. 1, 2009, XP55037258.

* cited by examiner

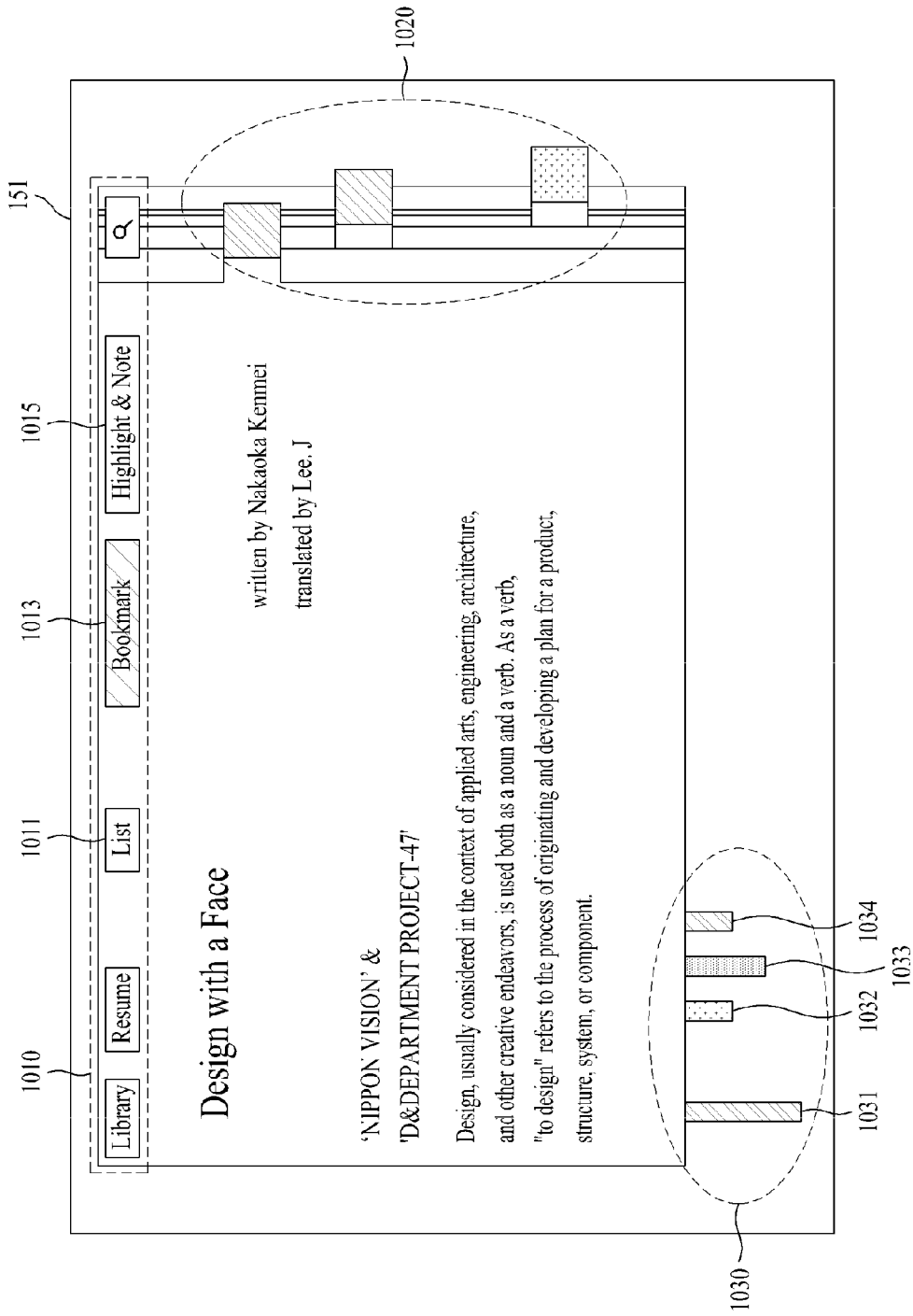

MOBILE TERMINAL AND METHOD FOR CONTROLLING THE MOBILE TERMINAL TO DISPLAY BOOKMARK ICONS FOR AN E-BOOK

CROSS-REFERENCE TO RELATED APPLICATIONS

Pursuant to 35 U.S.C. §119(a), this application claims the benefit of earlier filing date and right of priority to Korean Application No. 10-2011-0023294, filed on Mar. 16, 2011, the contents of which are hereby incorporated by reference herein in their entirety.

FIELD OF THE INVENTION

The present invention relates to a mobile terminal, and more particularly, to a mobile terminal and a method for controlling the mobile terminal.

DESCRIPTION OF THE RELATED ART

Generally, terminals can be classified into mobile or portable terminals and stationary terminals. Furthermore, the mobile terminals can be classified as handheld terminals and vehicle mount terminals according to whether users can carry the terminals on their person.

As the functions of such terminals are diversified, the terminals are implemented as multimedia players equipped with composite functions, such as capturing photos or moving images, playing back music or moving picture files, game play, and receiving broadcasts. To support and increase the functions of such terminals, improvements to the structural parts and/or software parts of the terminals may be considered.

Recently, mobile terminals have begun featuring general e-book displaying functions. An e-book is a special file format that can be viewed via a portable device, such as a mobile phone, a portable media player (PMP), or a personal digital assistant (PDA). In general, an e-book refers to a special file format in which a digital rights management (DRM) function is loadable for copyright protection, as opposed to universal file formats, such as basic text files.

An e-book displayer may generally support a memo function, a line drawing function, and a search function in accordance with a particular e-book displayer. However, such functions are typically limited to e-book displayers operating on personal computers (PCs). In contrast, the functions for displaying e-books in mobile terminals are considerably limited. Therefore, the demand for mobile terminals with increased e-book functionality and methods of controlling such mobile terminals is rapidly increasing.

SUMMARY OF THE INVENTION

Accordingly, the present invention is directed to a mobile terminal and a method for controlling the mobile terminal, which substantially obviate one or more problems due to limitations and disadvantages of the related art.

According to one embodiment, a mobile terminal includes a touch screen configured to display an e-book comprising one or more pages and a controller configured to set a bookmark on a selected page of the one or more pages when a touch input applied in a touch direction from an inner portion of the selected page toward an outer portion of the selected page is detected. The controller is further configured to generate and display a first type bookmark icon or a second type bookmark icon corresponding to the bookmark set on the selected page.

It is contemplated that the first type bookmark icon or the second type bookmark icon is generated according to the touch direction.

It is contemplated that the controller is further configured to generate and display the first type bookmark icon on an edge of the selected page in a substantially horizontal manner when the touch direction is substantially horizontal.

It is contemplated that at least one portion of the first type bookmark icon is displayed outside the selected page.

It is contemplated that the controller is further configured to display a window including selectable items for changing at least a color, a pattern, or a type of at least one portion of the first type bookmark icon when the first type bookmark icon is selected.

It is contemplated that the first type bookmark icon is at least an index tab, a flag, a detachable memo paper, or an attachable bookmark.

It is contemplated that the controller is further configured to display a range setting object on the selected page for specifying content to be indicated by the first type bookmark icon when the touch input is detected and when the touch direction of the touch input is substantially horizontal.

It is contemplated that the controller is further configured to consecutively display at least one page following the selected page while the touch input is applied until the touch input is completed to generate the first type bookmark icon for each of the at least one page following the selected page when the touch direction of the touch input is substantially horizontal.

It is contemplated that the controller is further configured to generate the first type bookmark icon for the selected page and at least one page following the selected page as a unit in proportion to a period of time it takes to complete the touch input and when the touch direction of the touch input is substantially horizontal.

It is contemplated that the controller is further configured to sequentially display the at least one page following the selected page at a predetermined speed during the period of time.

It is contemplated that the controller is further configured to generate the second type bookmark icon when the touch direction of the touch input is substantially vertical, and the second type bookmark icon includes at least table of contents information corresponding to the selected page, information about a user of the mobile terminal, or information indicating a time at which the second type bookmark icon was generated.

It is contemplated that the controller is further configured to enter a collective reading mode for displaying at least one previously generated bookmark icon and to display at least one partial region of the e-book on the touch screen when a specific command is received via the touch screen, at least one previously generated first type bookmark icon is displayed in a first region of the at least one partial region, and at least one previously generated second type bookmark icon is displayed in a second region of the at least one partial region.

It is contemplated that the at least one previously generated second type bookmark icon corresponds to at least one bookmark previously set by a user of another mobile terminal, and that the at least one bookmark previously set by the user of another mobile terminal includes at least a name of the user of another mobile terminal, a current page, or a date.

It is contemplated that the at least one partial region of the e-book is a partial region of a page displayed on the touch screen before a cover of the e-book or before the specific command is recognized.

It is contemplated that the first region comprises a right edge of the at least one partial region of the e-book, and the second region comprises a bottom side of the at least one partial region of the e-book.

It is contemplated that the controller is further configured to display a list of bookmarks on the touch screen that correspond to the first type bookmark icon among the at least one previously generated bookmark icon when the first region is selected in the collective reading mode, and display a list of bookmarks on the touch screen that correspond to the second type bookmark icon among the at least one previously generated bookmark icon when the second region is selected in the collective reading mode.

It is contemplated that the first region is selected via a drag or flicking touch input applied in a substantially horizontal direction on the first region, and the second region is selected via a drag or flicking touch input applied in a substantially vertical direction on the second region.

It is contemplated that the mobile terminal further includes a communication module configured to exchange data with at least one external device via a wired or wireless connection. It is further contemplated that the controller is further configured to share information included in the second type bookmark icon with the at least one external device, and display the shared information on the touch screen, such that the shared information is sorted according to at least the table of contents information, the information about the user of the mobile terminal, or the information indicating the time at which the second type bookmark icon was generated.

It is contemplated that the controller is further configured to execute a shortcut to the selected page when the first type bookmark icon or the second type bookmark icon on the selected page is selected via a touch input.

It is contemplated that the controller is further configured to no longer display the first type bookmark icon or the second type bookmark icon when a touch input applied at a prescribed point on the selected page is detected having a touch direction from an outer portion of the selected page toward an inner portion of the selected page.

In one embodiment, a method of controlling a mobile terminal includes displaying an e-book comprising one or more pages, detecting a touch input applied in a touch direction from an inner portion of a selected page of the one or more pages toward an outer portion of the selected page, setting a bookmark on the selected page; and generating and displaying a first type bookmark icon or a second type bookmark icon corresponding to the bookmark set on the selected page.

It is contemplated that the first type bookmark icon or the second type bookmark icon is generated according to the touch direction.

It is contemplated that the first type bookmark icon is generated and displayed on an edge of the selected page in a substantially horizontal manner when the touch direction is substantially horizontal.

It is contemplated that generating and displaying the first type bookmark icon or the second type bookmark icon includes generating and displaying the first type bookmark icon on an edge of the selected page in a substantially horizontal manner when the touch direction of the touch input is substantially horizontal, generating and displaying the second type bookmark icon when the touch direction of the touch input is substantially vertical. It is further contemplated that the second type bookmark icon includes at least table of contents information corresponding to the selected page, information about a user of the mobile terminal, or information indicating a time at which the second type bookmark icon was generated.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. The aspects, features, and advantages of the present invention will become more apparent upon consideration of the following description of preferred embodiments, taken in conjunction with the accompanying drawing figures. In the drawings:

FIGS. 10A through 10D are display screens of the touch screen showing exemplary configurations for displaying a collective reading menu in the mobile terminal in accordance with one embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The terms "module," "unit," and "part" are used herein with respect to various elements only to facilitate disclosure of the invention. Therefore, the terms "module," "unit," and "part" are used interchangeably herein.

The present invention can be applied to various types of terminals. For example, the terminals can include mobile terminals as well as stationary terminals, such as mobile phones, user equipments, smart phones, digital televisions (DTVs), computers, digital broadcast terminals, personal digital assistants, portable multimedia players (PMP) and navigators.

For ease of description, the present invention will be described with respect to a mobile terminal 100 shown in FIGS. 1 through 3. However, it should be understood that the present invention can also be applied to other types of terminals.

Figure 1:
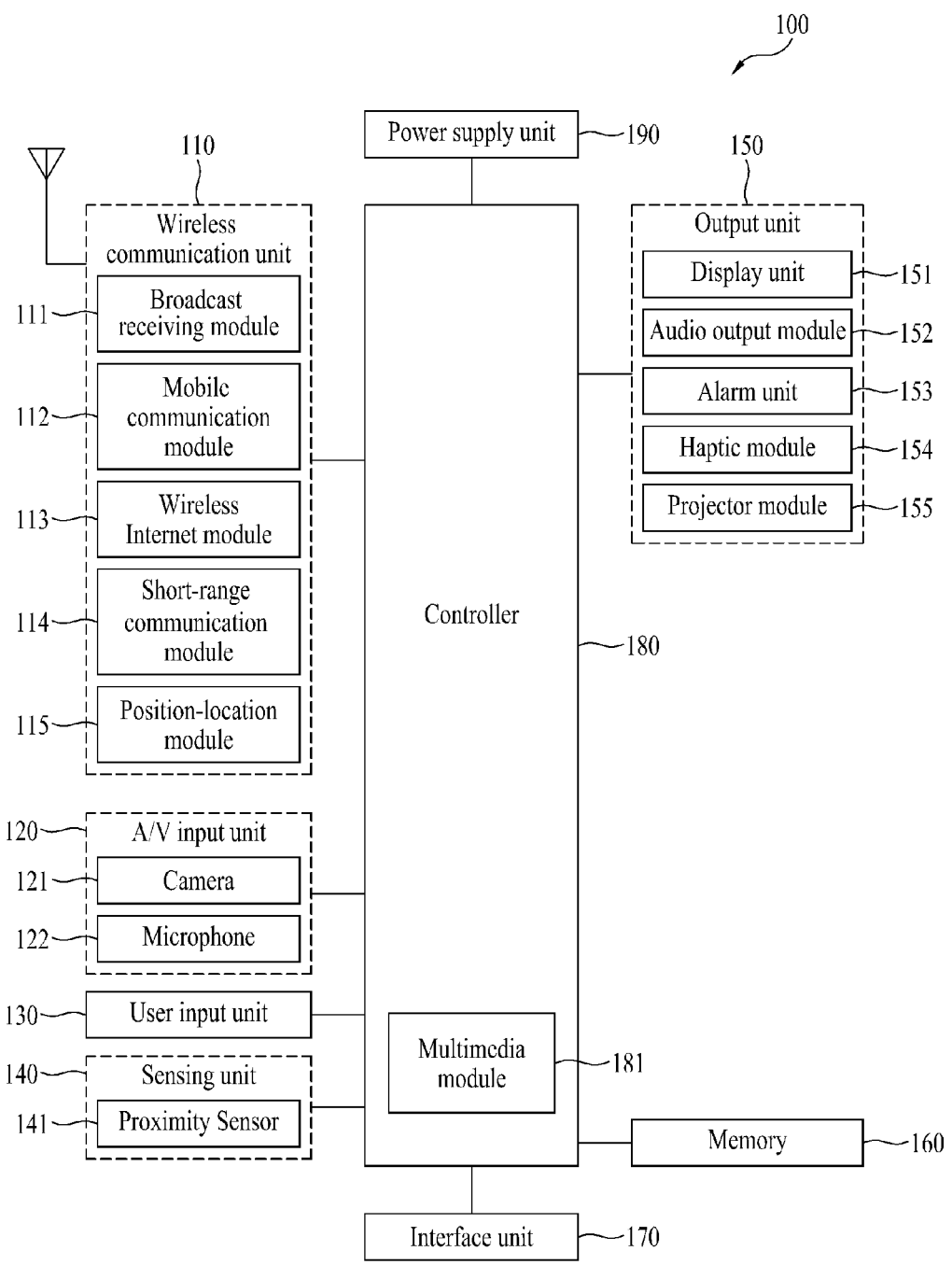
FIG. 1 illustrates a block diagram of a mobile terminal in accordance with one embodiment of the present invention.

FIG. 1 illustrates a block diagram of the mobile terminal 100 in accordance with one embodiment of the present invention. It should be understood that embodiments, configurations and arrangements other than that depicted in FIG. 1 can be used without departing from the spirit and scope of the invention. As shown in FIG. 1, the mobile terminal 100 includes a wireless communication unit 110, an audio/video (AV) input unit 120, a user input unit 130, a sensing unit 140, an output unit 150, a memory 160, an interface unit 170, a controller 180, and a power supply unit 190. It should be understood that the mobile terminal 100 may include additional or fewer components than those shown in FIG. 1.

The wireless communication unit 110 can include one or more components for allowing wireless communication between the mobile terminal 100 and a wireless communication system or network within which the mobile terminal 100 is located. For example, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast related information from an external broadcast management server via a broadcast channel.

The broadcast channel can include a satellite channel and a terrestrial channel. The broadcast management server can be a server that generates and transmits a broadcast signal and/or broadcast related information, or a server that receives a previously-generated broadcasting signal and/or previously-generated broadcasting-related information and transmits the previously-generated broadcast signal and/or previously-generated broadcasting-related information to the mobile terminal 100.

For example, the broadcast signal can be implemented as a TV broadcast signal, a radio broadcast signal, a data broadcast signal, and various other types of signals. In one embodiment, the broadcast signal can include a combination of the broadcast signal and a TV broadcast signal or a combination of the broadcast signal and a radio broadcast signal.

The broadcast-related information can include information related to a broadcast channel, a broadcast program, or a broadcast service provider. The broadcast-related information can be provided to the mobile terminal 100 through a mobile communication network. In such a case, the broadcast-related information can be received by the mobile communication module 112.

The broadcast-related information can be implemented in various forms. For example, the broadcast-related information can include an electronic program guide (EPG) of the digital multimedia broadcasting (DMB) standard, or an electronic service guide (ESG) of the digital video broadcast-handheld (DVB-H) standard.

The broadcast receiving module 111 can be configured to receive broadcast signals transmitted from various types of broadcast systems, such as digital multimedia broadcasting-terrestrial (DMB-T), digital multimedia broadcasting-satellite (DMB-S), DVB-H, the data broadcasting system known as media forward link only (MediaFLO®) and integrated services digital broadcast-terrestrial (ISDB-T) systems. The broadcast receiving module 111 can be configured to receive signals from broadcasting systems providing broadcasting signals other than the previously described digital broadcasting systems. The broadcast signal and/or broadcast-related information received via the broadcast receiving module 111 can be stored in a storage medium, such as the memory 160.

The mobile communication module 112 can transmit and/or receive wireless signals to and/or from at least one network entity, such as a base station, an external terminal, or a server. For example, such wireless signals can include audio, video, and data according to a transmission and reception of text/multimedia messages.

The wireless Internet module 113 can be a module that supports Internet access for the mobile terminal 100. The wireless Internet module 113 can be included in the mobile terminal 100 or installed in an external device that is coupled to the mobile terminal 100. For example, the wireless Internet technology implemented by the wireless Internet module 113 can be a wireless local area network (WLAN), Wi-Fi®, Wireless Broadband (WiBro®), World Interoperability for Microwave Access (WiMAX®), or High Speed Downlink Packet Access (HSDPA).

The short-range communication module 114 can be a module for supporting relatively short-range communications. For example, the short-range communication module 114 can be configured to communicate using short range communication technology, such as radio frequency identification (RFID), Infrared Data Association (IrDA), or Ultra-wideband (UWB), as well as networking technologies, such as Bluetooth® or ZigBee®.

The position-location module 115 identifies or otherwise obtains the location of the mobile terminal 100. In one embodiment, the position-location module 115 can include a global positioning system (GPS) module.

The A/V input unit 120 can be used to input an audio signal or a video signal, and can include a camera 121 and a microphone 122. For example, the camera 121 can receive and process image frames of still images or video obtained by an image sensor of the camera 121 in a video call mode or a photographing mode. The processed image frames can be displayed on a display unit 151.

The image frames processed by the camera 121 can be stored in the memory 160 or can be transmitted to an external device via the wireless communication unit 110. Other embodiments of the mobile terminal 100 can include more than one camera 121.

The microphone 122 can receive an external audio signal while the mobile terminal 100 is operating in a particular mode, such as a phone call mode, a recording mode or a voice recognition mode, and can process the received audio signal into electrical audio data. The audio data can then be converted into a form that can be transmitted to a mobile communication base station through the mobile communication module 112 in the call mode. The microphone 122 can apply various noise removal or noise canceling algorithms for removing or reducing noise generated when the external audio signal is received.

The user input unit 130 can generate input data in response to user manipulation of a corresponding input device or devices, such as a keypad, a dome switch, a touchpad, a jog wheel, or a jog switch. In one embodiment, the touchpad can be configured as a static pressure or capacitance type.

The sensing unit 140 can sense a change of position of the mobile terminal 100 or a component of the mobile terminal 100, relative positioning of components of the mobile terminal 100, such as a display and keypad, whether a user touches the mobile terminal 100, an orientation of the mobile terminal 100, acceleration or deceleration of the mobile terminal 100, and a current state of the mobile terminal 100, such as an open or close state. The sensing unit 140 can also include a proximity sensor 141.

The sensing unit 140 can generate a sensing signal for controlling the operation of the mobile terminal 100 according to a detected status of the mobile terminal. For example, when the mobile terminal 100 is implemented as a slide type phone, the sensing unit 140 can sense whether the mobile terminal 100 is opened or closed. Further, the sensing unit 140 can sense whether the power supply unit 190 supplies power and whether the interface unit 170 is connected to an external device.

The output unit 150 can generate visual, auditory and/or tactile outputs and can include the display unit 151, an audio output module 152, an alarm unit 153, a haptic module 154, and a projector module 155. The display unit 151 can be configured to display information associated with the mobile terminal 100.

For example, when the mobile terminal 100 is in a call mode, the display unit 151 can display a user interface (UI) or a graphic user interface (GUI) including information associated with placing, conducting, and terminating a call. For example, when the mobile terminal 100 is in the video call mode or the photographing mode, the display unit 151 can additionally or alternatively display images which are associated with such modes, the UI or the GUI.

The display unit 151 can be implemented using display technologies including, for example, a liquid crystal display (LCD), a thin film transistor-liquid crystal display (TFT-LCD), an organic light-emitting diode display (OLED), a flexible display and a three-dimensional display. The mobile terminal 100 can be configured to include more than one display unit 151.

For example, the mobile terminal 100 can include a number of display units 151 that are arranged on a single face of the mobile terminal 100, and can be spaced apart from one another or integrated in one body. The number of display units 151 can also be arranged on different sides of the mobile terminal 100.

In one embodiment, the display used in the display unit 151 can be a transparent type or an optical transmissive type, such that the display unit 151 is implemented as a transparent display. For example, the transparent display can include a transparent OLED (TOLED) display. The rear structure of the display unit 151 can also be of an optical transmissive type. Accordingly, a user may see an object located behind the body of the mobile terminal 100 through the transparent area of the body of the mobile terminal 100 that is occupied by the display unit 151.

When the display unit 151 and a sensor for sensing a user touch (hereinafter referred to as a "touch sensor") are configured as a layered structure to form a touch screen, the display unit 151 can be used as an input device in addition to an output device. For example, the touch sensor can be in the form of a touch film, a touch sheet, or a touch pad.

The touch sensor can convert a variation in pressure applied to a specific portion of the display unit 151 or a variation in capacitance generated at a specific portion of the display unit 151 into an electric input signal. The touch sensor can sense pressure resulting from a touch, as well as the position and area of the touch.

When the user applies a touch input to the touch sensor, a signal corresponding to the touch input can be transmitted to a touch controller (not shown). The touch controller can process the signal and transmit data corresponding to the processed signal to the controller 180. The controller 180 can then use the data to identify a touched portion of the display unit 151.

The proximity sensor 141 of the sensing unit 140 can be located in an internal region of the mobile terminal 100 and either be enclosed by the touch screen or around the touch screen. The proximity sensor 141 can sense an object approaching a prescribed detecting surface or an object located near the proximity sensor 141 without any physical contact using an electromagnetic field or infrared rays. The longevity of the proximity sensor 141 can substantially exceed the longevity of a contact sensor, and the proximity sensor 141 can have greater utility than a contact sensor.

The proximity sensor 141 can include a transmissive photo-electric sensor, a direct reflective photo-electric sensor, a mirror reflective photo-electric sensor, a radio frequency oscillation proximity sensor, an electrostatic capacity proximity sensor, a magnetic proximity sensor, and/or an infrared proximity sensor. In one embodiment, the touch screen can include an electrostatic capacity proximity sensor, such that a proximity of a pointer can be detected through a variation in an electric field according to the proximity of the pointer. Accordingly, the touch screen or touch sensor can be classified as the proximity sensor 141.

For purposes of clarity, an action of the pointer approaching the touch screen and being recognized without actually contacting the touch screen will be herein referred to as a "proximity touch," while an action of bringing the pointer into contact with the touch screen will be herein referred to as a "contact touch." A proximity touch position of the pointer on the touch screen can correspond to a position on the touch screen from which the pointer is situated perpendicularly with respect to the touch screen.

A proximity touch and a proximity touch pattern can be detected via the proximity sensor 141, such as a proximity touch distance, a proximity touch duration, a proximity touch position, or a proximity touch movement state. For example, information corresponding to the detected proximity touch action and proximity touch pattern can be displayed on the touch screen.

The audio output module 152 can output audio data received from the wireless communication unit 110, or stored in the memory 160, in a call receiving mode, a call placing mode, a recording mode, a voice recognition mode, or a broadcast receiving mode. The audio output module 152 can also provide audio signals related to particular functions performed by the mobile terminal 100, such as a call received or a message received. For example, the audio output module 152 can include a speaker, a buzzer, or other audio output device.

The alarm unit 153 can output a signal for indicating the occurrence of an event of the mobile terminal 100 using vibration as well as video or audio signals. Events that may be indicated are a call received event, a message received event and a touch input received event. The video or audio signals can also be output via the display unit 151 or the audio output module 152. Therefore, in various embodiments, the display unit 151 or the audio output module 152 can be considered part of the alarm unit 153.

The haptic module 154 can generate various tactile effects that can be physically sensed by the user. For example, a tactile effect generated by the haptic module 154 can include vibration. The intensity and/or pattern of the vibration generated by the haptic module 154 can be controlled. For example, different vibrations can be combined and provided or sequentially provided.

The haptic module 154 can generate a variety of tactile effects in addition to a vibration. Such tactile effects include an effect caused by an arrangement of vertically moving pins that are in contact with the skin of the user; an effect caused by a force of air passing through an injection hole or a suction of air through a suction hole; an effect caused by skimming over the user's skin; an effect caused by contact with an electrode; an effect caused by an electrostatic force; and an effect caused by the application of cold and warm temperatures using an endothermic or exothermic device.

For example, the haptic module 154 can enable a user to sense the tactile effects through a muscle sense of the user's finger or arm, as well as to transfer the tactile effect through direct contact. Optionally, the mobile terminal 100 can include at least two haptic modules 154 according to the configuration of the mobile terminal 100.

The projector module 155 is an element for performing an image projection function of the mobile terminal 100. In one embodiment, the projector module 155 can be configured to display an image identical to or partially different from an image displayed by the display unit 151 on an external screen or wall according to a control signal of the controller 180.

For example, the projector module 155 can include a light source (not shown), such as a laser, that generates adequate light for external projection of an image, an image producing element (not shown) for producing an image to be projected via the light generated from the light source, and a lens (not shown) for enlarging the projected image according to a predetermined focus distance. The projector module 155 can further include a device (not shown) for adjusting the direction in which the image is projected by mechanically moving the lens or the entire projector module 155.

The projector module 155 can be classified as a cathode ray tube (CRT) module, a liquid crystal display (LCD) module, or a digital light processing (DLP) module according to a type of the image producing element used. For example, the DLP module operates by enabling the light generated from the light source to reflect on a digital micro-mirror device (DMD) chip and can advantageously reduce the size of the projector module 155.

The projector module 155 can preferably be configured in a lengthwise direction along a side, front or back of the mobile terminal 100. It should be understood, however, that the projector module 155 can be configured on any portion of the mobile terminal 100.

The memory 160 can store various types of data to support the processing, control, and storage requirements of the mobile terminal 100. For example, the various types of data can include program instructions for applications operated by the mobile terminal 100, contact data, phone book data, messages, audio, still images, and/or moving images.

A recent use history or a cumulative usage frequency of each type of data can be stored in the memory unit 160, such as usage frequency of each phonebook, message or multimedia. Moreover, data for various patterns of vibration and/or sound output when a touch input is performed on the touch screen can be stored in the memory unit 160.

The memory 160 can be implemented using any type or combination of suitable volatile and non-volatile memory or storage devices, such as a flash memory, a hard disk type memory, a multimedia card micro type memory, a card type memory, such as a Secure Digital (SD) card or Extreme Digital (xD) card, a random access memory (RAM), a static random access memory (SRAM), a read-only memory (ROM), an erasable programmable read-only memory (EPROM), a programmable ROM (PROM), an electrically erasable programmable read-only memory (EEPROM), a magnetic memory, a magnetic disk, an optical disk, or other type of memory or data storage device. In other embodiments, the memory 160 can be a storage device that can be accessed by the mobile terminal 100 via the Internet.

The interface unit 170 can couple the mobile terminal 100 to external devices. The interface unit 170 can receive data from the external devices or power, and transmit the data or power to internal components of the mobile terminal 100. In addition, the interface unit 170 can transmit data of the mobile terminal 100 to the external devices. The interface unit 170 can include, for example, a wired or wireless headset port, an external charger port, a wired or wireless data port, a memory card port, a port for connecting a device having an identity module, an audio input/output (I/O) port, a video I/O port, and/or an earphone port.

The identity module is the chip for storing various kinds of information for authenticating the authority to use the mobile terminal 100. For example, the identity module can be a user identity module (UIM), a subscriber identity module (SIM) or a universal subscriber identity module (USIM). A device including the identity module (hereinafter referred to as an "identity device") can also be manufactured in the form of a smart card. Therefore, the identity device can be connected to the mobile terminal 100 via a corresponding port of the interface unit 170.

When the mobile terminal 100 is connected to an external cradle, the interface unit 170 can serve as a conduit to allow power from the cradle to be supplied to the mobile terminal 100, or can serve as a conduit to allow various command signals input by the user via the external cradle to be transmitted to the mobile terminal 100. Various command signals or power provided by the external cradle can be used as signals for recognizing that the mobile terminal 100 is properly loaded in the external cradle.

The controller 180 can control the general operations of the mobile terminal 100. For example, the controller 180 can be configured to perform control and processing associated with voice calls, data communication, and/or video calls. The controller 180 can perform pattern recognition processing to recognize a character or image from a handwriting input or a picture-drawing input performed on the touch screen.

The controller 180 can include a multimedia module 181 for playing multimedia. The multimedia module 181 can be integrated into the controller 180 as shown in FIG. 1, or can be external to the controller 180.

The power supply unit 190 can be an external power source, an internal power source, or a combination thereof. The power supply unit 190 can supply power to other components in the mobile terminal 100.

Various embodiments described herein can be implemented via a computer-readable medium using, for example, computer software, hardware, or a combination thereof. For example, the components of the mobile terminal 100 described herein can be implemented in hardware using at least application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, and/or combinations thereof. In other embodiments, such components can be implemented by the controller 180.

For example, the procedures or functions described herein can be implemented in software using separate software modules that allow performance of at least one function or operation. Software codes can be implemented by a software application or program written in any suitable programming language. The software codes can be stored in the memory 160 and executed by the controller 180.

Figure 2:
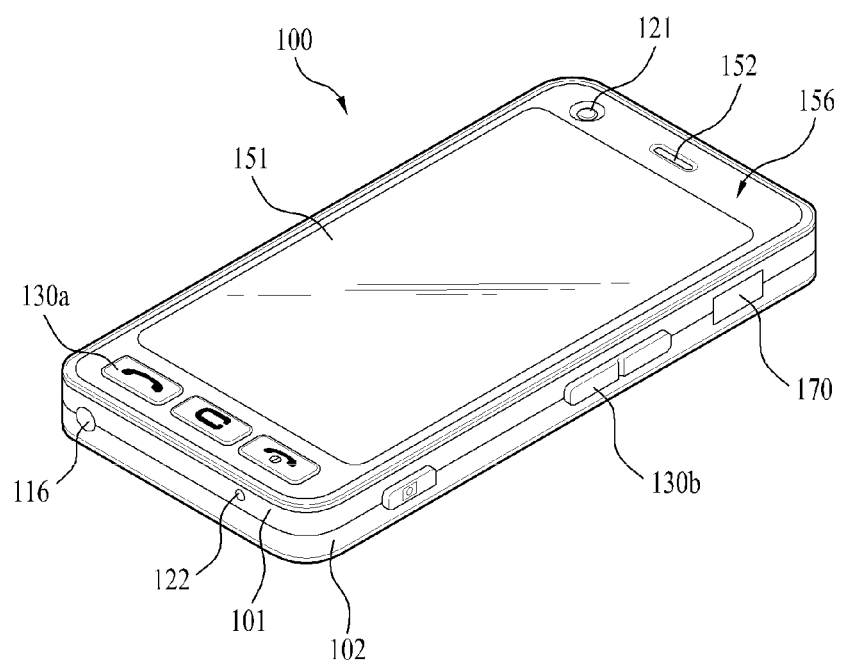
FIG. 2 is a front perspective view of the mobile terminal in accordance with one embodiment of the present invention.

FIG. 2 is a front perspective view of the mobile terminal 100 in accordance with one embodiment of the present invention. In FIG. 2, the mobile terminal 100 is shown to have a bar type terminal body.

It should be understood, however, that the mobile terminal 100 is not limited to a bar type terminal body and can have various other body types. Examples of such body types include a slide type body, folder type body, swing type body, a rotational type body, or combinations thereof. Although the disclosure herein is primarily with respect to a bar-type mobile terminal 100, it should be understood that the disclosure can be applied to other types of mobile terminals.

As shown in FIG. 2, the case of the mobile terminal 100 (otherwise referred to as a "casing," "housing," or "cover") forming the exterior of the mobile terminal 100 can include a front case 101 and a rear case 102. Various electronic components are installed in the space between the front case 101 and the rear case 102. One or more intermediate cases can be additionally disposed between the front case 101 and the rear case 102. For example, the front case 101 and the rear case 102 can be made by injection-molding of a synthetic resin or can be made using a metal, such as stainless steel (STS) or titanium (Ti).

The display unit 151, the audio output module 152, the camera 121, user input modules 130a and 130b, the microphone 122, or the interface unit 170 can be situated on the mobile terminal 100, and specifically, on the front case 101.

As shown in FIG. 2, for example, the display unit 151 can be configured to occupy a substantial portion of the front face 156 of the front case 101. As also shown in FIG. 2, the audio output unit 152 and the camera 121 can be arranged in proximity to one end of the display unit 151, and the user input module 130a and the microphone 122 can be located in proximity to another end of the display unit 151. As further shown in FIG. 2, the user input module 130b and the interface unit 170 are arranged on the sides of the front case 101 and the rear case 102.

The user input unit 130 described previously with respect to FIG. 1 can be configured to receive a command for controlling an operation of the mobile terminal 100 and can include one or more user input modules 130a and 130b shown in FIG. 2. The user input modules 130a and 130b can each be referred to as a "manipulation unit" and can be configured to employ various methods and techniques of tactile manipulation and response to facilitate operation by the user.

The user input modules 130a and 130b can be configured for inputting different commands relative to one another. For example, the user input module 130a can be configured allow a user to input commands such as "start," "end," and "scroll" to the mobile terminal 100. The user input module 130b can allow a user to input a command for adjusting the volume of the audio output unit 152 or a command for switching to a touch recognition mode of the display unit 151.

Figure 3:
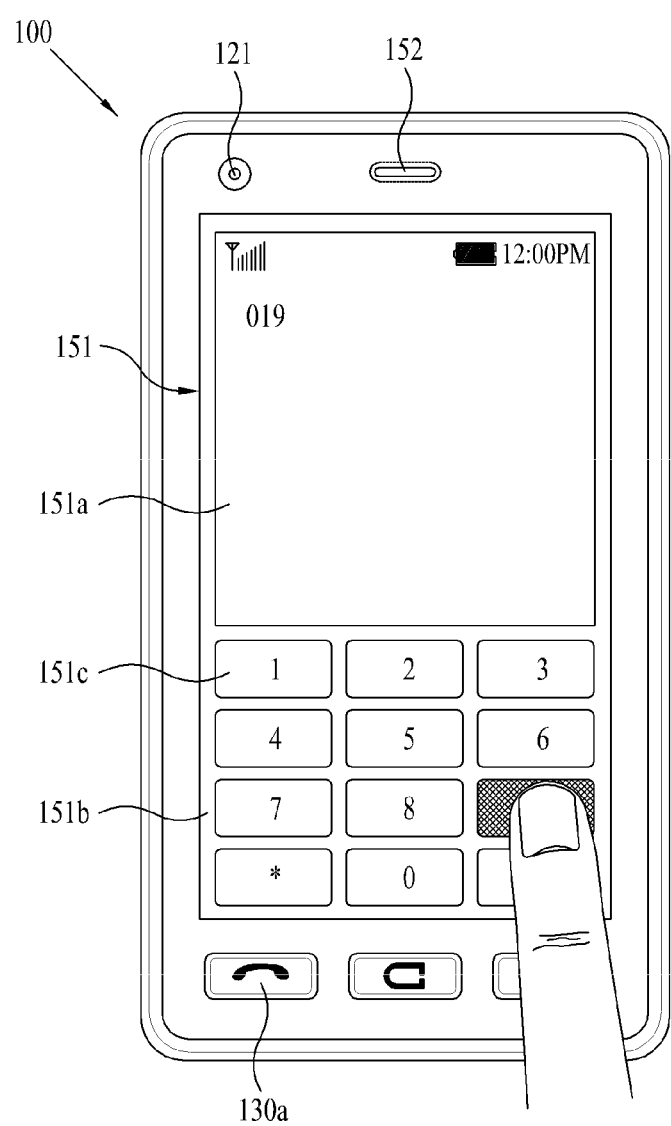
FIG. 3 is a front-view of the mobile terminal according to various embodiment of the present invention.

FIG. 3 is a front-view of mobile terminal 100 according to various embodiment of the present invention. Various kinds of visual information can be displayed on the display unit 151, such as characters, numerals, symbols, graphics, and icons. In order to input information, at least one of the characters, numerals, symbols, graphics and icons are represented as a single predetermined array to be implemented in a keypad formation on the display unit 151. This keypad formation is also referred to as "soft keys."

FIG. 3 shows a touch input applied to a soft key via a front face of a terminal body. The display unit 151 is operable through an entire area of the display unit 151 or by a number of divided regions on the display unit 151. In the latter case, the number of divided regions can be interoperable with each other.

For example, an output window 151a and an input window 151b are displayed on the display unit 151. A soft key 151c representing a digit for inputting a phone number or other data is displayed in the input window 151b. If the soft key 151c is touched, a digit corresponding to the touched soft key is displayed in the output window 151a. If the user input module 130a is manipulated, a call connection for the phone number displayed in the output window 151a is attempted.

Additionally, the display unit 151 may be configured to receive a touch input by scroll. A user scrolls the display unit 151 to shift a cursor or pointer located at an entity, such as an icon, displayed on the display unit 151. When a finger is shifted on the display unit 151, a path of the shifted finger can be visually displayed on the display unit 151. This may be useful when editing an image displayed on the display unit 151.

In one embodiment, the mobile terminal 100 can be configured as a dedicated e-book terminal, such that the main function of the mobile terminal 100 is to display e-books. Alternatively, the mobile terminal 100 can be configured to perform a number of various functions in addition to displaying an e-book through an application.

Figure 4A:
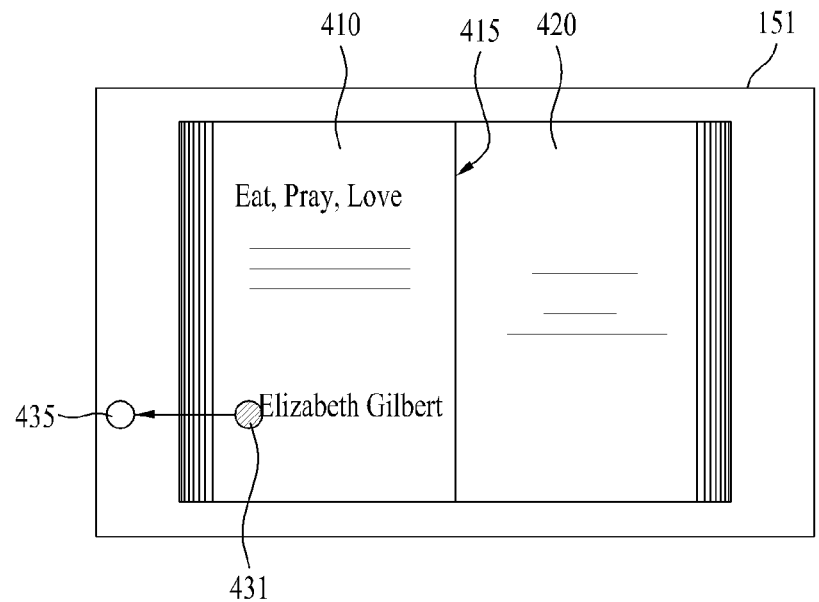
FIGS. 4A and 4B are display screens of the display unit showing an operation for setting a bookmark in accordance with one embodiment of the present invention.
Figure 4B:
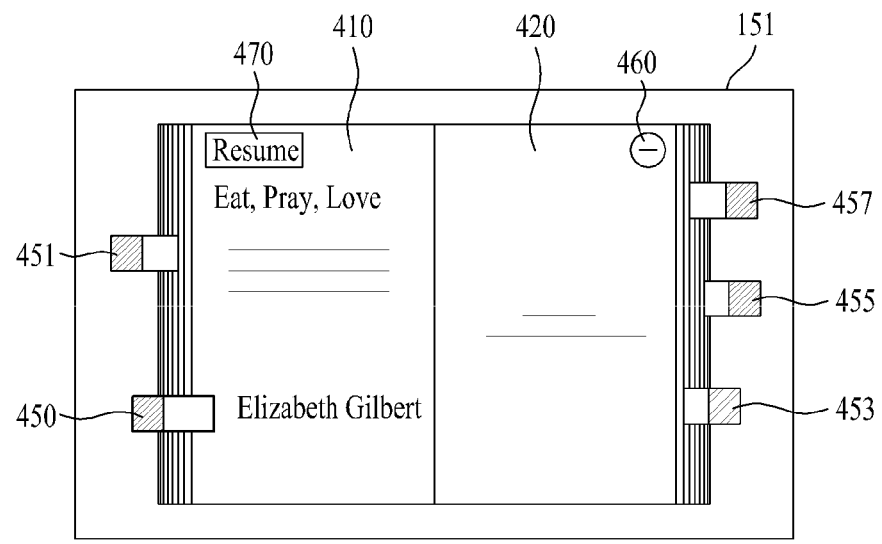

Exemplary e-book reading screens and a bookmark setting method of the mobile terminal 100 will now be explained with reference to FIGS. 4A through 8B. FIGS. 4A and 4B are display screens of the display unit 151 (hereinafter referred to as the "touch screen 151") showing an operation for setting a bookmark in accordance with one embodiment of the present invention.

As shown in FIG. 4A, the touch screen 151 can display content of an e-book within two pages of a simulated open book, such that the left page 410 is arranged adjacent to the right page 420 in a horizontal direction. In one embodiment, the positions of the currently displayed pages, such as the left page 410 and the right page 420, relative to the total pages of the e-book can be represented by the thickness of the stack of pages under each of the currently displayed pages.

For example, when an e-book is configured to be read from a left page to a right page and the currently displayed pages are in an early stage of the e-book, the stack of pages under the currently displayed left page can appear thin and the stack of pages under the currently displayed right page can appear thick. Moreover, the stack of pages can be displayed by forming steps or an incline to simulate the natural appearance of an opened physical book.

Referring to FIG. 4A, when an e-book reading mode is executed by the mobile terminal 100, the left page 410 and the right page 420 are displayed as the current pages of the e-book on the touch screen 151. In one embodiment, a user can set a bookmark on a currently displayed page by applying a touch input, such as a drag or flicking touch input, in a substantially horizontal direction from an inner portion of a currently displayed page to an outer portion of the currently displayed page. In other words, the touch input can be applied in a horizontal direction away from the boundary 415 between the currently displayed pages.

As shown in FIG. 4A, a bookmark can be set on the left page 410 when a touch input, such as a drag or flicking touch input, is applied in a horizontal direction starting at a point 431 within the left page 410 and ending at a point 435 outside of the left page 410. The controller 180 can recognize the touch input as a command for generating a bookmark. The controller 180 can then form a bookmark for the left page 410 and generate a bookmark icon 450 for displaying the formed bookmark adjacent to a side of the left page 410, as shown in FIG. 4B.

In the embodiment of FIGS. 4A and 4B, the position of the bookmark icon 450 corresponds to the starting and ending points 431 and 435 of the touch input. In another embodiment, the position of the bookmark icon 450 can correspond to a position near the point at which the touch input applied in a horizontal or vertical direction is detected. In another embodiment, the position of the bookmark icon 450 can correspond to a position that is spaced apart by a prescribed distance from the point at which the touch input applied in a horizontal or vertical direction is detected.

Such embodiments for positioning the bookmark icon 450 are advantageous for text or content based bookmarks. For example, when displaying an e-book that only includes text, the position or page of a sentence of text can change if a letter type or font size of the text is changed. Therefore, when text or content on a page is targeted by a user and a touch input is applied in a horizontal or vertical direction at a point adjacent to the text or content to generate a bookmark, the bookmark can be configured to appear adjacent to the text or content even when the page of the text or content is changed.

The bookmark icon 450 can have various types, such as a rectangular index tab, a flag, a detachable memo paper, or an attachable bookmark. When a bookmarked page is displayed on the touch screen 151, it is preferable that the corresponding bookmark icon is configured to be viewable notwithstanding that the bookmarked page becomes covered as a result of page turning and notwithstanding the type of the corresponding bookmark icon. For example, the corresponding bookmark icon can be displayed as protruding from a side of the stacked pages of the e-book.

Preferably, as shown in FIG. 4A, at least one portion of the bookmark icon 450 overlaps a page of the e-book and another portion of the bookmark icon 450 does not overlap the page of the e-book. In other words, the another portion of the bookmark icon 450 is situated outside of the page.

In one embodiment, the controller 180 can provide an animation effect when the touch input for generating the bookmark is detected. For example, when the bookmark icon 450 is generated, the controller 180 provides an animation effect of tape being attached to a corresponding page.

It should be understood that the touch input for generating the bookmark icon 450 is not limited to the previously described embodiment of FIG. 4A where the touch input starts at the point 431 on a page and ends at a point 435 outside of the page. More specifically, when a direction of the touch input for generating the bookmark is toward the outside of the page, a start point of the touch input is not limited to a point on the page and an end point of the touch input is not limited to a point outside of the page.

As shown in FIG. 4B, when the bookmark icon 450 is generated, a bookmark editing mode can automatically be entered by the controller 180. In the bookmark editing mode, all bookmark icons 451, 453, 455 and 457 previously generated for the corresponding e-book can be displayed. Moreover, a delete icon 460 for deleting a generated bookmark, a resume icon 470 for terminating the bookmark editing mode, and other editing icons can be arranged on a top side of the touch screen 151.

For example, when the resume icon 470 is selected, the bookmark editing mode is terminated and the bookmark icons 451, 453, 455 and 457, and the delete icon 460 are no longer displayed on the touch screen 151. Accordingly, the user can continue to read the e-book in a clean view state. Therefore, previously generated bookmark icons 451, 453, 455 and 457 can be displayed only in the bookmark editing mode.

In other embodiments, the previously generated bookmark icons 451, 453, 455 and 457 can be continuously displayed on the touch screen 151. In such embodiments, the previously generated bookmark icons 451, 453, 455 and 457 and the last generated bookmark icon can be concurrently displayed despite terminating the bookmark editing mode and entering the clean view state.

When one of the previously generated and displayed bookmark icons 451, 453, 455 and 457 is selected via a touch input, a position of the e-book corresponding to the selected bookmark is displayed. For example, the position of the e-book can be a page or content in the e-book to which the selected bookmark was previously set to correspond.

If a touch input is applied on a bookmark icon and contact with the bookmark icon is maintained, content of the page corresponding to the bookmark icon can be displayed in part with a visual effect that slightly reveals the page on which the corresponding bookmark icon is set. For example, the visual effect can provide an effect of lifting the pages stacked on the bookmarked page to a prescribed height to allow viewing of a portion of the bookmarked page in a region under the lifted pages. The lifted pages can be returned to their original positions when contact with the bookmark icon is no longer maintained.

In order to perform a page turning operation, a drag or flicking touch input can be applied in a horizontal direction from an outer portion of the e-book to an inner portion. Preferably, when a page is turned, a bookmark icon displayed on the turned page is also turned. For example, when a first page is displayed on the left side of an e-book and a second page with a bookmark icon is displayed on the right side of the e-book, a third page behind the second page becomes situated on the left side after the second page is turned. Accordingly, the bookmark icon which was situated on the right side becomes situated on the left side at a corresponding position on the second page, such that the backside of the bookmark icon is displayed on the left side with the third page.

Figure 5A:
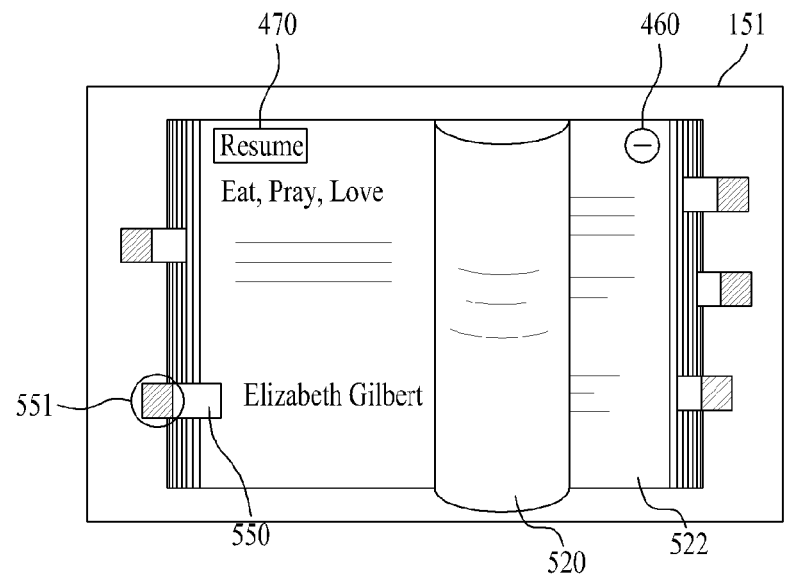
FIGS. 5A and 5B are display screens of the touch screen showing an operation for setting a single bookmark for a number of pages of an e-book in the mobile terminal in accordance with one embodiment of the present invention.
Figure 5B:
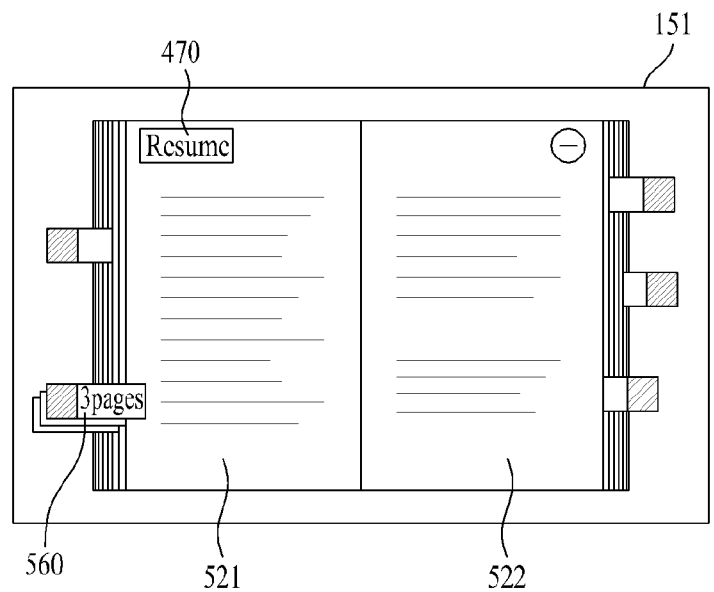

In one embodiment, a single bookmark can be set for a number of pages as a unit, which will be described with reference to FIGS. 5A and 5B. FIGS. 5A and 5B are display screens of the touch screen 151 showing an operation for setting a single bookmark for a number of pages of an e-book in the mobile terminal 100 in accordance with one embodiment of the present invention.

With reference to FIG. 5A, a user can provide a touch input for generating a bookmark at a point corresponding to a page or content as previously discussed with respect to FIG. 4A. In order to generate a single bookmark for a number of consecutive pages, the user can provide a touch input for generating a bookmark on the touch screen 151 and can maintain contact with the touch screen 151 at an end point of the touch input. When a bookmark icon 550 is generated and an animation of an index tab being attached to a corresponding page is displayed, the point at which contact with the touch screen 151 is maintained appears as a tip 551 of the index tab, as shown in FIG. 5A.

As further shown in FIG. 5A, the pages on the right side of the e-book, such as the right page 520, can be turned at a prescribed speed while contact with the touch screen 151 is maintained. Moreover, the previously discussed bookmark editing mode can be activated while contact with the touch screen 151 is maintained.

After a specific number of pages have been turned, a bookmark icon can be generated for each of the turned pages such that the generated bookmark icons are arranged in a stacked manner, as shown in FIG. 5B. The number of bookmarked pages, a page number, a paragraph number and other information can be displayed on the bookmark icon, such as the bookmark icon 560, of the last bookmarked page.

After a touch input is performed and contact with the touch screen 151 is maintained in order to bookmark a number of pages, contact with the touch screen is no longer maintained, for example, on page 521 situated on a backside of the right page 520. Text indicating the total number of bookmarked pages, such as "3 pages," can then be displayed on the bookmark icon on the page where contact with the touch screen 151 is no longer maintained.

After the bookmark has been set, the bookmark editing mode can be terminated when the user selects the resume icon 470 provided at the top side of the touch screen 151. The user can then read the e-book in a clean view state.

Figure 6:
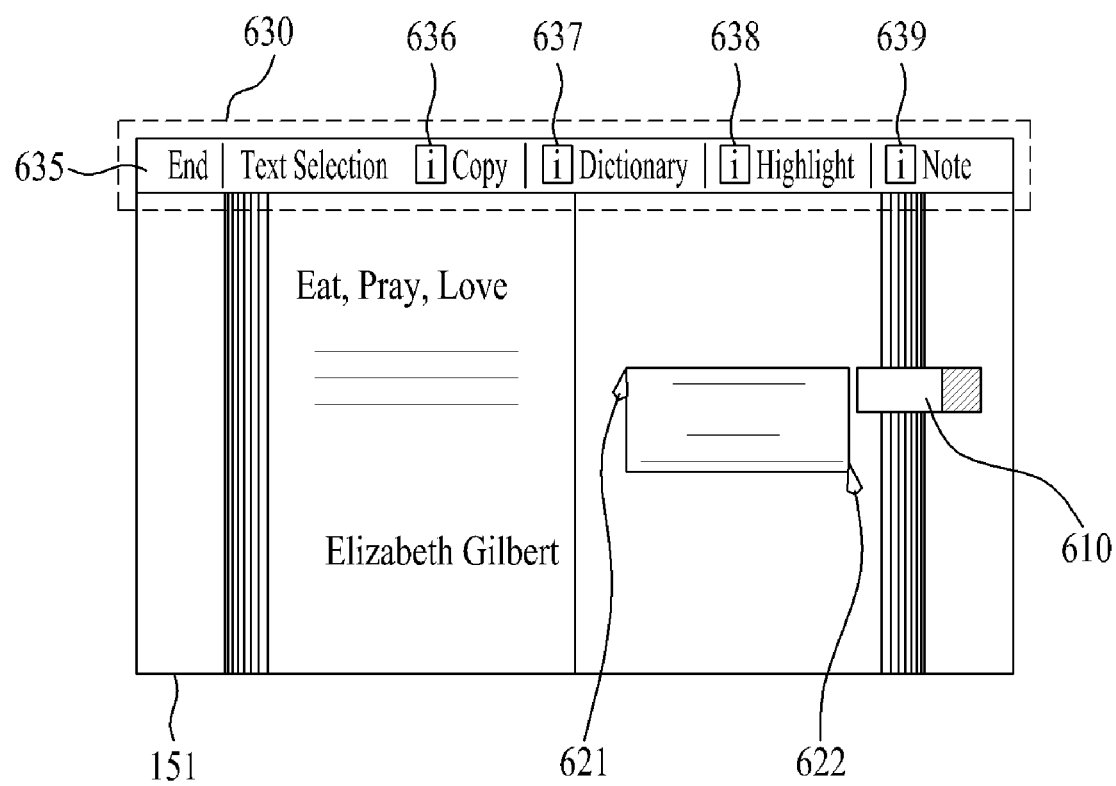
FIG. 6 is a display screen of the touch screen showing an operation for setting a content based bookmark to indicate a specified range of content of the e-book in the mobile terminal in accordance with one embodiment of the present invention.

In one embodiment of the present invention, a content based bookmark can be set to indicate a specified range of content of the e-book, which will be described with reference to FIG. 6. FIG. 6 is a display screen of the touch screen 151 showing an operation for setting a content based bookmark to indicate a specified range of content of the e-book in the mobile terminal 100 in accordance with one embodiment of the present invention.

Referring to FIG. 6, a user can provide a touch input for generating a bookmark icon, such as the bookmark icon 610, at a point corresponding to a page or content as previously discussed with respect to FIG. 4A. When the touch input for generating the bookmark icon 610 is completed, range setting icons 621 and 622 can be displayed to specify the content to be indicated by the bookmark icon 610. The range setting icons 621 and 622 can be used to set a starting point 621 and an ending point 622 of the content to be indicated by the bookmark icon 610 by using a touch input, such as a drag touch input, to change the respective positions of the range setting icons 621 and 622.

In one embodiment, when a range setting icon is displayed, a side menu window 630 can be displayed on a top side of the touch screen 151. For example, the side menu window 630 can include an end menu item 635 for switching to a clean view mode after the content to be indicated by the bookmark icon has been specified, a menu item 636 for copying a specified range of content to a clip board, a menu item 637 for searching a dictionary for a specified range of content, a menu item 638 for applying a visual effect, such as a highlight, to a specified range of content, and a menu item 639 for adding a note.

In the embodiment of FIG. 6, the specified range of content includes text. However, in other embodiments, a range of various types of content included in an e-book can be specified, such as diagrams, figures, symbols, and multimedia.

Figure 7A:
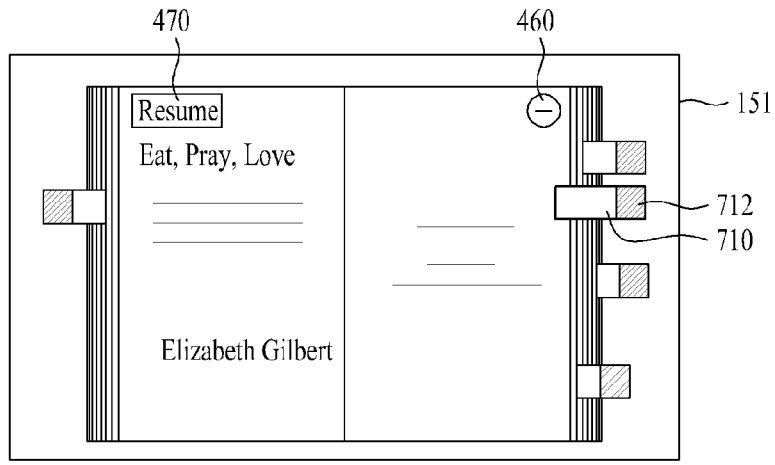
FIGS. 7A through 7C are display screens of the touch screen 151 showing an operation for setting an index tab type of bookmark icon for an e-book in the mobile terminal in accordance with one embodiment of the present invention.
Figure 7B:
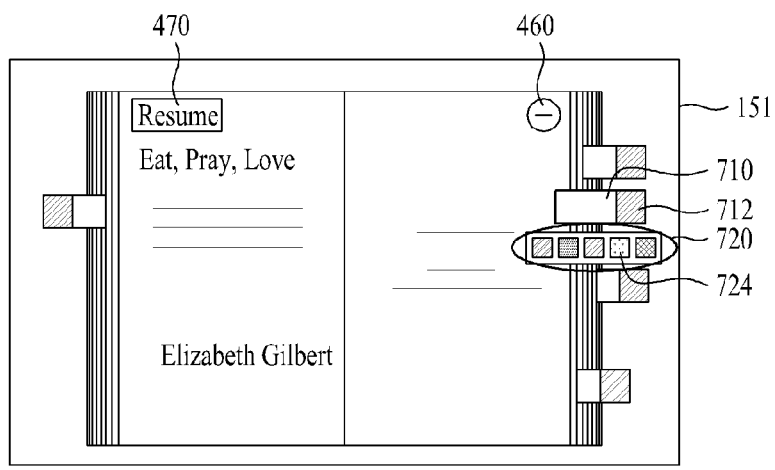
Figure 7C:
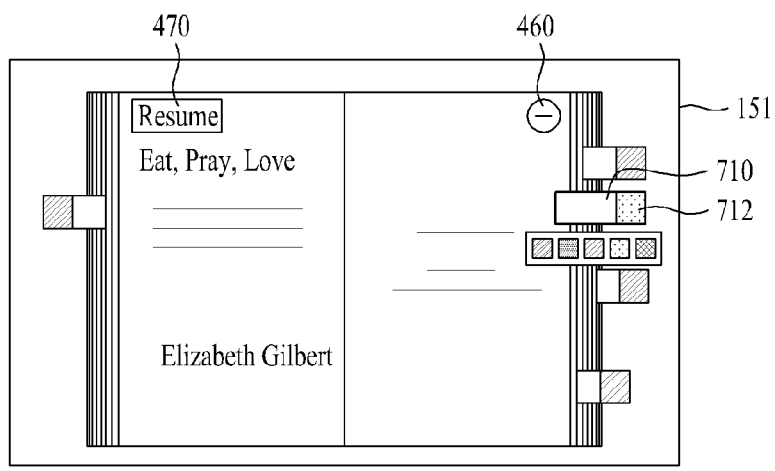

In one embodiment of the present invention, a bookmark icon for an e-book of the mobile terminal 100 can be configured as an index tab, such that a color of the index tab can be designated or changed to represent a category, which will be described with reference to FIGS. 7A through 7C. FIGS. 7A through 7C are display screens of the touch screen 151 showing an operation for setting an index tab type of bookmark icon for an e-book in the mobile terminal 100 in accordance with one embodiment of the present invention.

As shown in FIG. 7A, a bookmark can be set and a corresponding bookmark icon 710 of an index tab type can be generated on a right-hand page of an e-book displayed in a reading mode of the mobile terminal 100. In the embodiment of FIG. 7A, the bookmark editing mode of the mobile terminal 100 is activated and the tab edge 712 of the bookmark icon 710 can be configured to have one of various colors. In one embodiment, the mobile terminal 100 can be configured with a basic setting to display the tab edge with a color when the bookmark icon 710 is generated.

Referring to FIG. 7B, when a user selects the bookmark icon 710 via a touch input, a window 720 including selectable tab colors can be displayed near the bookmark icon 710. For example, if the user selects a 4th color 724 from the window 720, the tab edge 712 of the bookmark icon 710 can be changed to the 4th color, as shown in FIG. 7C. Thereafter, the user can terminate the bookmark editing mode by selecting the resume icon 470. The user can then read the e-book in a clean view state.

Figure 8A:
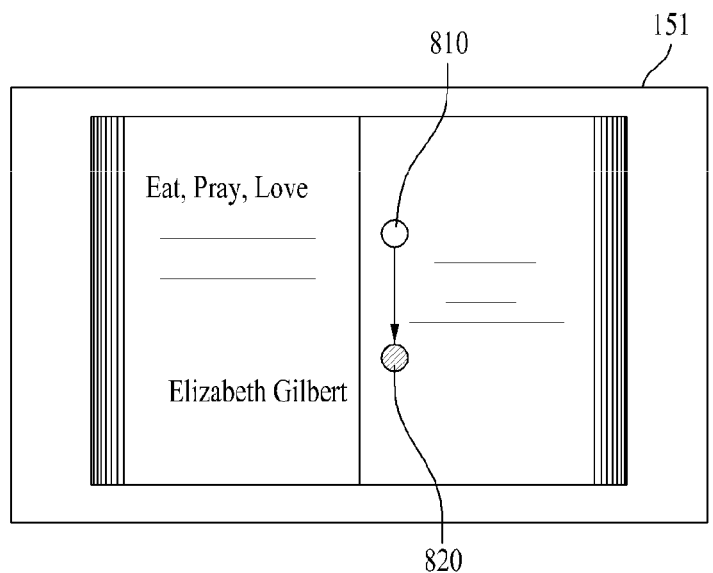
FIGS. 8A and 8B are display screens of the touch screen showing an operation for setting a bookmark in an e-book of the mobile terminal via a touch input performed in a vertical direction in accordance with one embodiment of the present invention.
Figure 8B:
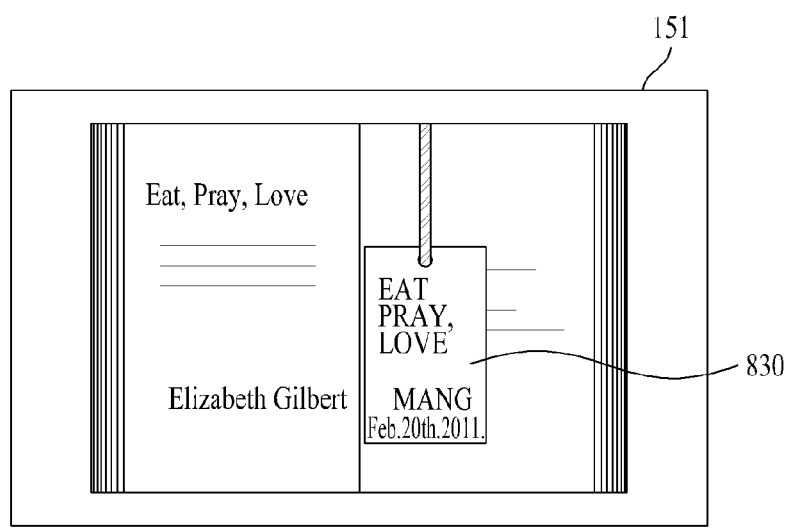

The embodiment of FIGS. 7A through 7C relates to setting a bookmark for an e-book in response to a touch input applied in a horizontal direction and generating a corresponding bookmark icon. Alternatively, a bookmark for an e-book can be set in response to a touch input applied in a vertical direction, which will be described with reference to FIGS. 8A and 8B. FIGS. 8A and 8B are display screens of the touch screen 151 showing an operation for setting a bookmark in an e-book of the mobile terminal 100 via a touch input performed in a vertical direction in accordance with one embodiment of the present invention.

As shown in FIG. 8A, a user can set a bookmark on a currently displayed page of the e-book by applying a drag or flicking touch input in a vertical direction on the currently displayed page. For example, when the controller 180 detects a touch input, such as a drag touch input or a flicking touch input, that starts at a point 810 within the currently displayed page and ends at a point 820 situated below the point 810, the controller 180 can recognize the touch input as a command for generating a bookmark.

Once the command for generating a bookmark is recognized, the controller 180 can then form a bookmark for the currently displayed page and generate a bookmark icon 830 for displaying the formed bookmark on the currently displayed page, as shown in FIG. 8B. In the embodiment of FIG. 8B, the bookmark icon 830 appears as a tag connected to a ribbon. It should be understood, however, that the bookmark icon 830 can have various types, such as a rectangular index tab, a flag, a detachable memo paper, or an attachable bookmark.

The bookmark icon 830 can be configured to display various information, such as a time at which the corresponding bookmark was set, the title of the e-book, the title of a chapter, and a user name. Such a bookmark icon is useful for indicating an e-book reading progress. Based on the settings of the mobile terminal 100, when the e-book reading mode is terminated after setting the bookmark via the touch input in the vertical direction, the bookmarked page can be set to be directly displayed when an e-book reading mode is later executed for displaying the e-book.

In one embodiment, the controller 180 can provide an animation effect when the touch input for generating the bookmark is detected. For example, when the bookmark icon 830 is generated, the controller 180 provides an animation effect such that the bookmark icon appears over a backside of the e-book displayed on the touch screen 151.

For clarity and convenience of the following description, the type of bookmark described with reference to FIGS. 4A to 7B will be referred to as the "first type bookmark" and the type of bookmark described with reference to FIGS. 8A and 8B will be referred to as the "second type bookmark."

Figure 9A:
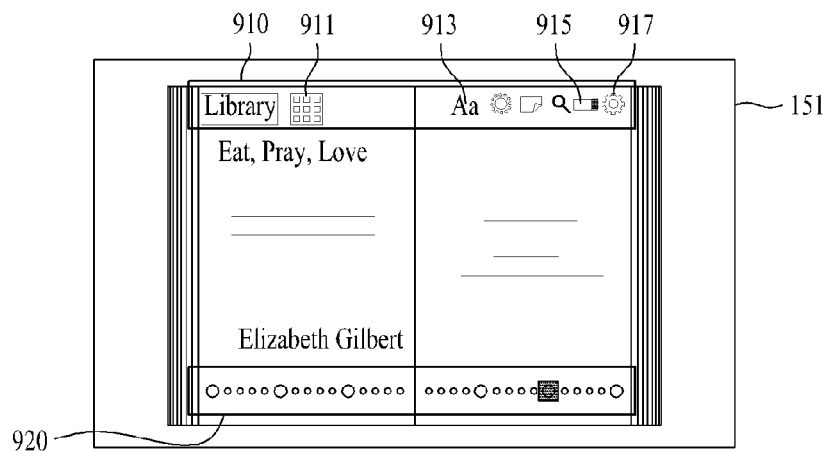
FIGS. 9A through 9C are display screens of the touch screen showing an operation for executing a side function via a bookmark of an e-book in the mobile terminal in accordance with one embodiment of the present invention.
Figure 9B:
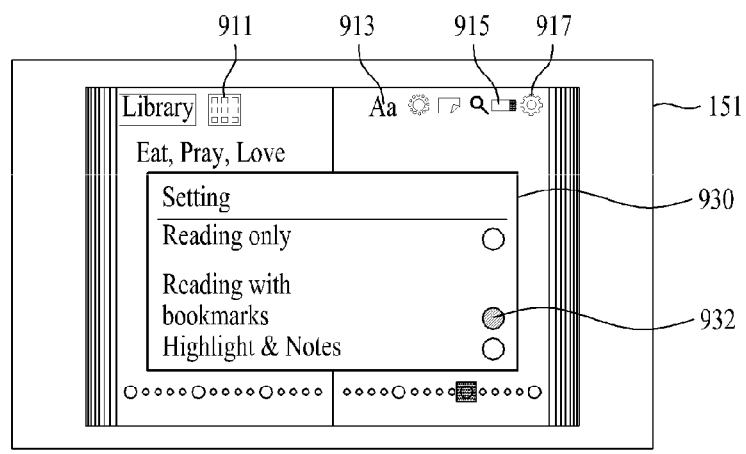
Figure 9C:
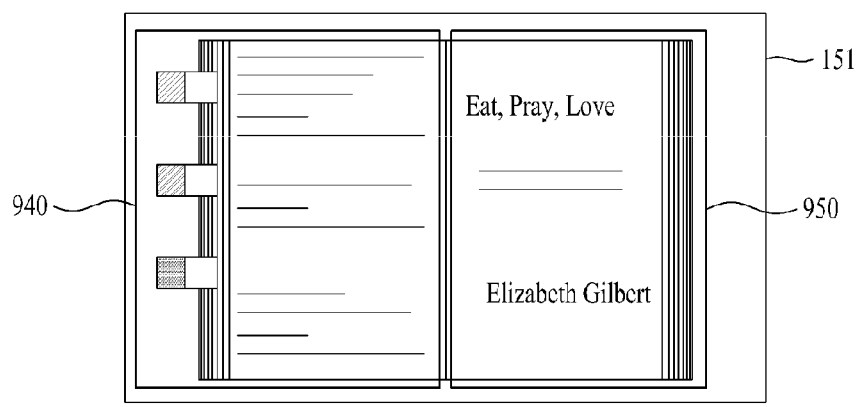

The first type bookmark can be removed by selecting a delete icon in an edit mode of the mobile terminal 100. Alternatively, the first type bookmark can be removed by applying a drag or flicking touch input on the first type bookmark in a direction that is opposite to the direction of the touch input that was used to set the first type bookmark while a touch is applied to at least one point of a page. In other words, the drag or touch input can be used to remove the first type bookmark in manner similar to detaching a strip of tape from a book. The second type bookmark can be removed by applying a drag or flicking touch input on the second type bookmark in a direction that is opposite to the direction of the touch input that was used to set the second type bookmark In one embodiment, side functions of the mobile terminal 100 can be executed via the first and second types of bookmarks. Bookmarked content is always displayed on a prescribed region of a display unit and pages of an e-book can be displayed on a remaining region of the display unit that excludes the prescribed region. This is described with reference to FIGS. 9A thorough 9C as follows. FIGS. 9A through 9C are display screens of the touch screen 151 showing an operation for executing a side function via a bookmark of an e-book in the mobile terminal 100 in accordance with one embodiment of the present invention.

As shown in FIG. 9A, a side function mode can be initiated when the mobile terminal 100 is operating in an e-book reading mode in a clean view state by applying a touch input having a prescribed pattern or by manipulating a virtual or hardware key button. For example, the touch input having the prescribed pattern can be a touch input applied to a specific point on the e-book, such as an edge of the e-book, or multiple touches that are consecutively applied at a predetermined interval.

As shown in FIG. 9A, a menu window 910 including various kinds of side function shortcut icons can be displayed on a top side of the touch screen 151 and a page bar 920 can be displayed on a bottom side of the touch screen 151 when the side function mode is initiated. For example, the side function shortcut icons can include a collective reading menu icon 911, a font adjusting icon 913, a bookmark setting icon 915, and a reading-with-bookmark menu 917.

When the bookmark setting icon 913 has been selected and when a random page or content is selected by a touch input, a bookmark can be set in association with the corresponding position of the touch input. The page bar 920 can indicate a position of a currently displayed page relative to the total pages of the e-book.

As shown in FIG. 9B, a popup window 930 for setting the reading-with-bookmark function can be displayed when the reading-with-bookmark menu item 917 is selected. As further shown in FIG. 9B, a user can use the popup window 930 to select whether to continue to maintain a clean view mode, whether to activate a reading-with-bookmark function 932, or whether to activate a reading with highlight & notes function set by the user.

As shown in FIG. 9C, the touch screen 151 is partitioned into a left region 940 and a right region 950 when the reading-with-bookmark function is activated. In particular, bookmarks and content or portions of content indicated by the bookmark icons are displayed together in the left region 940. A size of a page of an e-book can be displayed in the right region 950.

When a new bookmark is set on the page displayed in the right region 950, real-time information on the newly added bookmark can be further displayed in the left region 940. The bookmark displayed on the left region 940 can include a previously set bookmark for the e-book, a bookmark for a chapter corresponding to the page displayed on the right region 950, or a bookmark set during a predetermined period of time.

It should be understood that the previously described positions of the menu windows, and the arrangement and types of the side function shortcut icons are exemplary and can be modified in other embodiments. The present invention can be applied to a method for entering side functions of various types, menu window configurations, and side function shortcut icon configurations.

The collective reading menu of the menu window 910 previously described with reference to FIG. 9A will now be explained in detail with reference to FIGS. 10A through 10D. FIGS. 10A through 10D are display screens of the touch screen 151 showing exemplary configurations for displaying a collective reading menu in the mobile terminal 100 in accordance with one embodiment of the present invention. In FIGS. 10A through 10D, the first type bookmark icons are displayed as index tabs where a color of the tab edge of each index tab can be changed.

As shown in FIG. 10A, the collective reading menu is activated and displayed on the touch screen 151 when the collective reading menu icon 911 is selected from the side function mode menu window 910 previously described with reference to FIG. 9A. As the collective reading menu is activated, a select region 1010 for selecting a collective reading target is displayed on a top side of the touch screen 151. A list reading icon 1011, a bookmark collective reading icon 1013, and a highlight & note reading icon 1015 can be displayed in the select region 1010.

When the bookmark collective reading icon 1013 is selected via a touch input from the user, a first type bookmark collection 1020 and a second type bookmark collection 1030 are respectively displayed on a right side and a bottom side of the touch screen 151 in accordance with a default setting of the collective reading menu. Furthermore, a background image of an initial screen can include a cover of a corresponding e-book or an enlarged portion of a page, which was displayed when a side function mode was activated.

In the first type bookmark collection 1020, the bookmark icons can be displayed according to their actual positions on corresponding pages of the e-book. Alternatively, the bookmark icons can be displayed as a collection of some or all of the stored bookmark icons without regard to their actual positions. When a bookmark icon is configured as an index tab as previously described with respect to FIGS. 7A through 7C, and when a number of different tab edge colors are set in accordance with a category or setting, one bookmark icon per color can be displayed.

The bookmark icons displayed in the second type bookmark collection 1030 can be of the same type as the second type bookmark icon previously described with respect to FIGS. 8A and 8B. Alternatively, the bookmark icons displayed in the second type bookmark collection 1030 can be of different types with respect to the second type bookmark icon.

In the embodiment of FIG. 10A, the bookmark icons displayed in the second type bookmark collection 1030 are of different types with respect to the second type bookmark icon previously described with respect to FIGS. 8A and 8B. For example, the bookmark icons in the second type bookmark collection 1030 are displayed as bands, such as bands 1031, 1032, 1033 and 1034, where the length and/or color of each band is different. Furthermore, each band can be configured to represent a corresponding second type bookmark icon. The length or color of the band can be determined according to a time at which the bookmark icon was generated or according to a list of contents indicated by the bookmark icon.

Figure 10B:
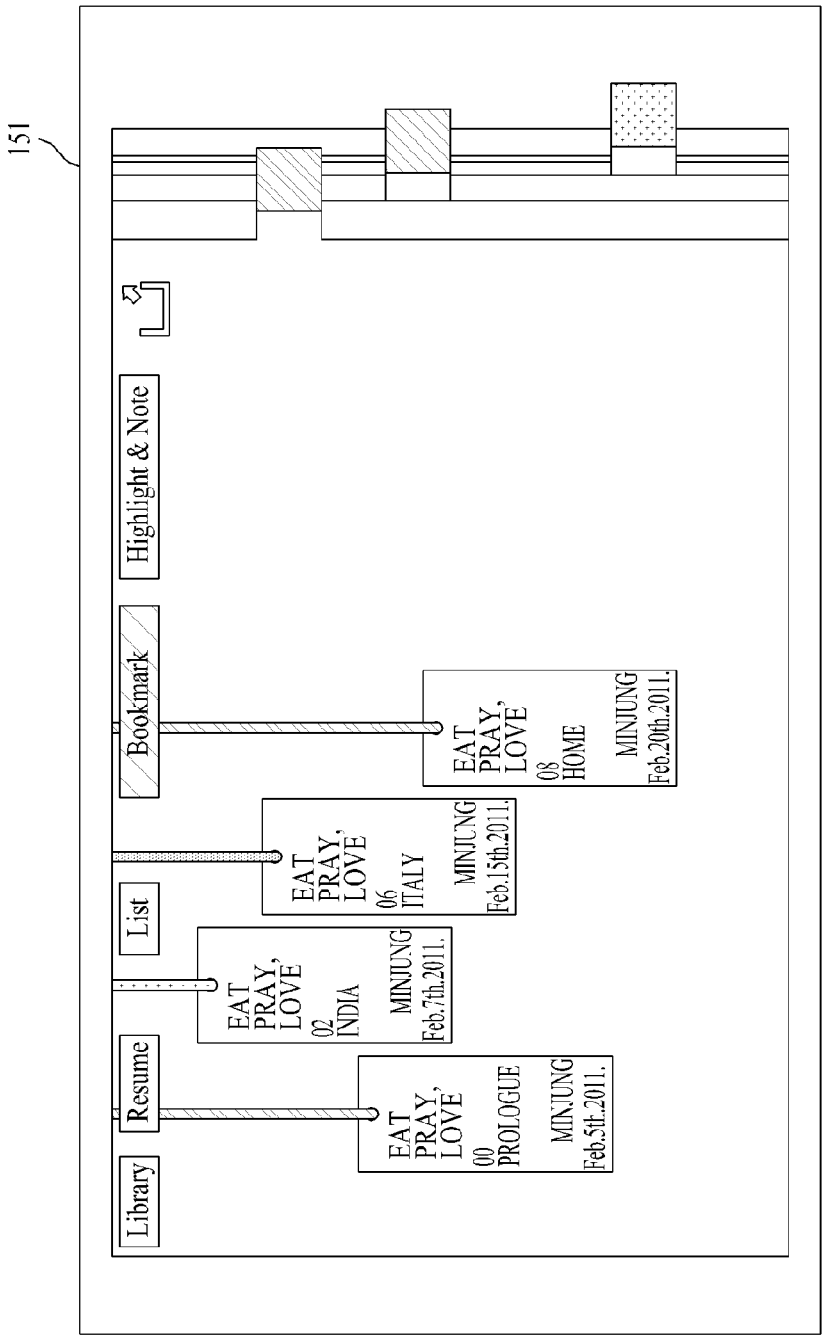

While the state shown in FIG. 10A is maintained, a second type bookmark collective reading function can be executed when the bookmark icons displayed in the second type bookmark collection 1030 are selected by applying a touch or by dragging a band downward to simulate a pulling motion as shown in FIG. 10B.

After the second type bookmark collective reading function is executed, the second type bookmark icons previously stored for the corresponding e-book can be sorted based on a prescribed rule and displayed accordingly. Since the time at which a corresponding bookmark was previously set is displayed on each of the second type bookmark icons, a user can conveniently check the reading history of the e-book using the second type bookmark collective reading function.

Figure 10C:
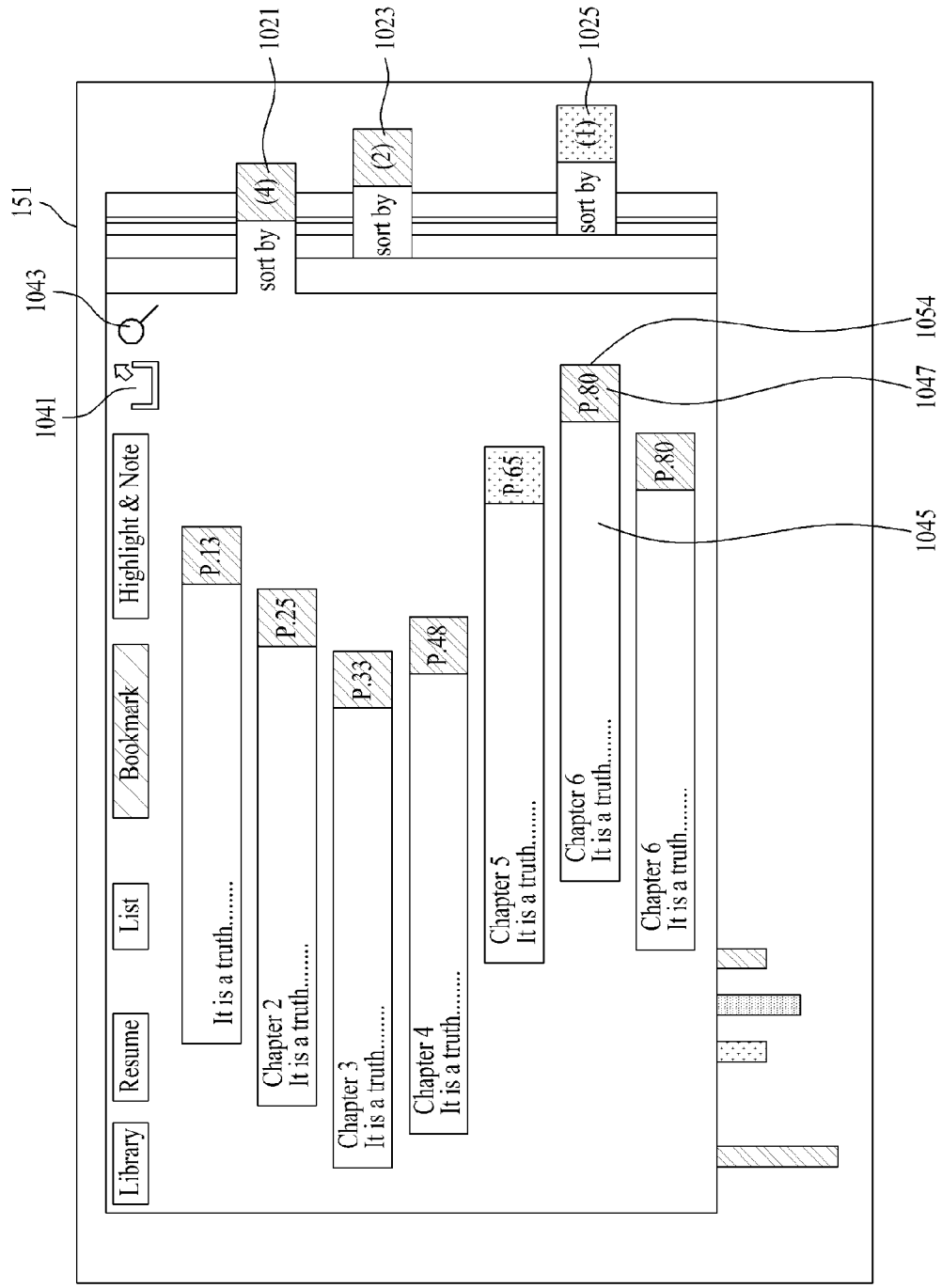

While the state shown in FIG. 10A is maintained, a first type bookmark collective reading function can be executed when the bookmark icons displayed in the first type bookmark collection 1020 are selected by a touch or by being dragged in a horizontal direction to simulate a pulling motion toward the outside of the e-book, as shown in FIG. 10C.

After the first type bookmark collective reading function is executed, a list (hereinafter referred to as a "bookmark list") of the first type bookmarks previously stored for the e-book is displayed on the center of the display screen and the first type bookmark icons 1021, 1023 and 1025 are displayed on the right side of the touch screen 151 after being sorted according to type. Each bookmark item in the bookmark list can have a rectangular shape that includes an index tab portion 1045 and a tab edge 1047 having a color or pattern.

In the embodiment of FIG. 10C, each index tab portion 1045 is extended in a horizontal direction and each bookmark item in the bookmark list is sorted according to page number. Moreover, at least one portion of a page or content indicated by a corresponding bookmark is displayed within the extended index tab portion 1045 and a page number is displayed on the corresponding tab edge 1047.

The number of bookmark icons that have the same color or pattern can be displayed on each corresponding one of the first type bookmark icons 1021, 1023, and 1025 displayed on the right side of the e-book. In one embodiment, when a prescribed one of the first type bookmark icons displayed on the right side of the e-book is selected, only the bookmark items in the bookmark list corresponding to the color or pattern of the selected bookmark icon can be displayed.

Figure 10D:
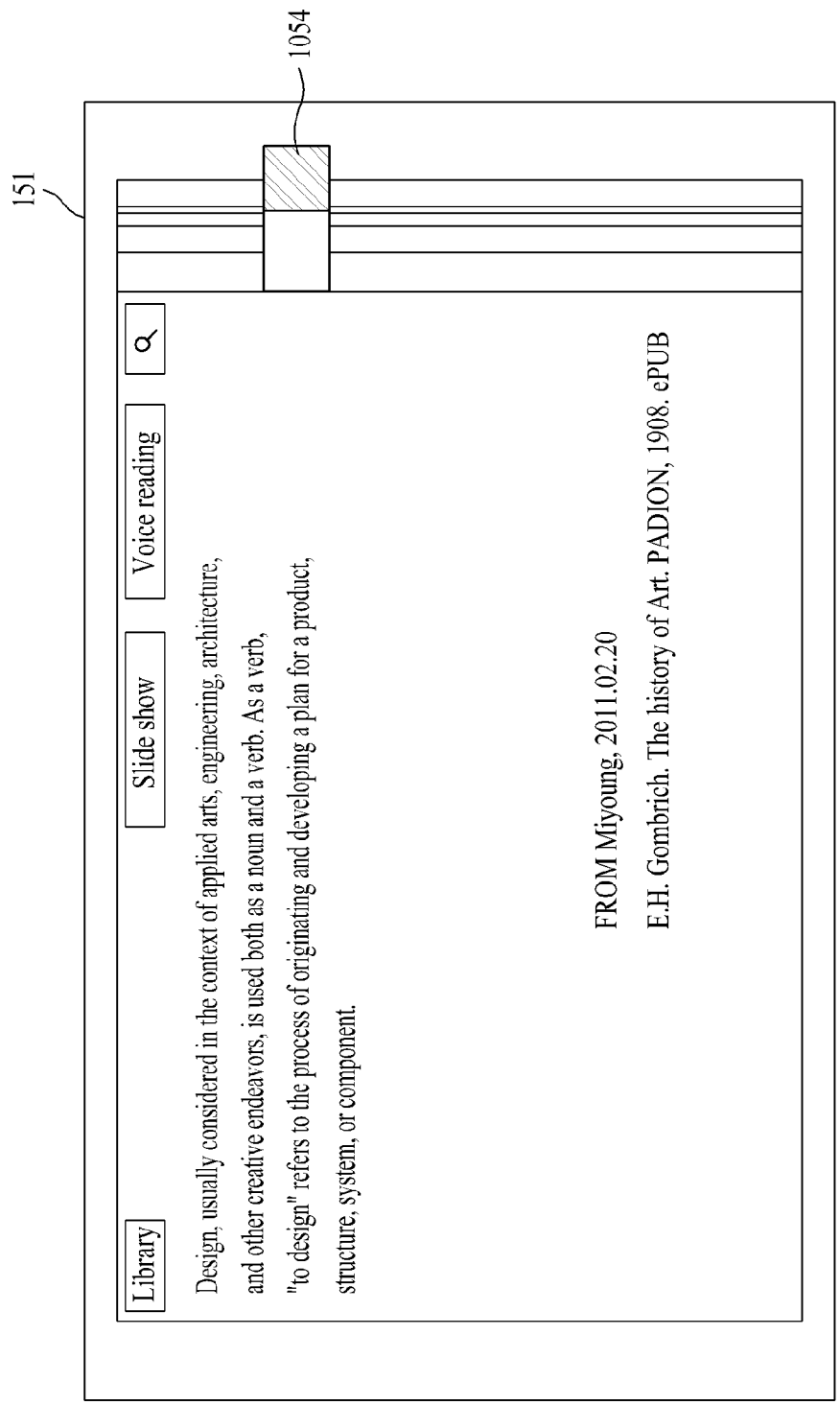

In one embodiment, when a prescribed bookmark item 1054 is selected from the bookmark list, the entire content indicated by the bookmark corresponding to the selected bookmark item can be displayed, as shown in FIG. 10D. Upon selecting the prescribed bookmark item, the name of the user that set the corresponding bookmark, a date, and information regarding the e-book can be further displayed. In another embodiment, when a prescribed bookmark item is selected from the bookmark list, a shortcut to a page or content indicated by the bookmark corresponding to the selected bookmark item can be executed.

As shown in FIG. 10C, an outgoing transmission icon 1041 and a search icon 1043 can be further displayed on the top side of the touch screen 151. When the outgoing transmission icon 1041 and a bookmark item in the bookmark list are selected in sequence, or when a bookmark item in the bookmark list is dragged to the outgoing transmission icon 1041, information with respect to the corresponding bookmark item can be transmitted to an external device via the wireless communication unit 110. When the search icon 1043 and a bookmark item in the bookmark list are selected in sequence, or when a bookmark item in the bookmark list is dragged to the search icon 1043, a search for content indicated by the bookmark item can be performed via a Web search engine.

The e-book related information, which includes information about the previously described bookmarks, can be shared between users. In one embodiment, the e-book related information can include a list of e-books retained by each user, a highlight or note information set for each e-book, and information about bookmarks.

The e-book related information can be shared wirelessly via the wireless communication unit 110 or by a wired interface, such as the interface unit 170. Moreover, the e-book related information can be shared periodically or in real-time. The e-book related information can be shared each time a user command is input.

Figure 11:
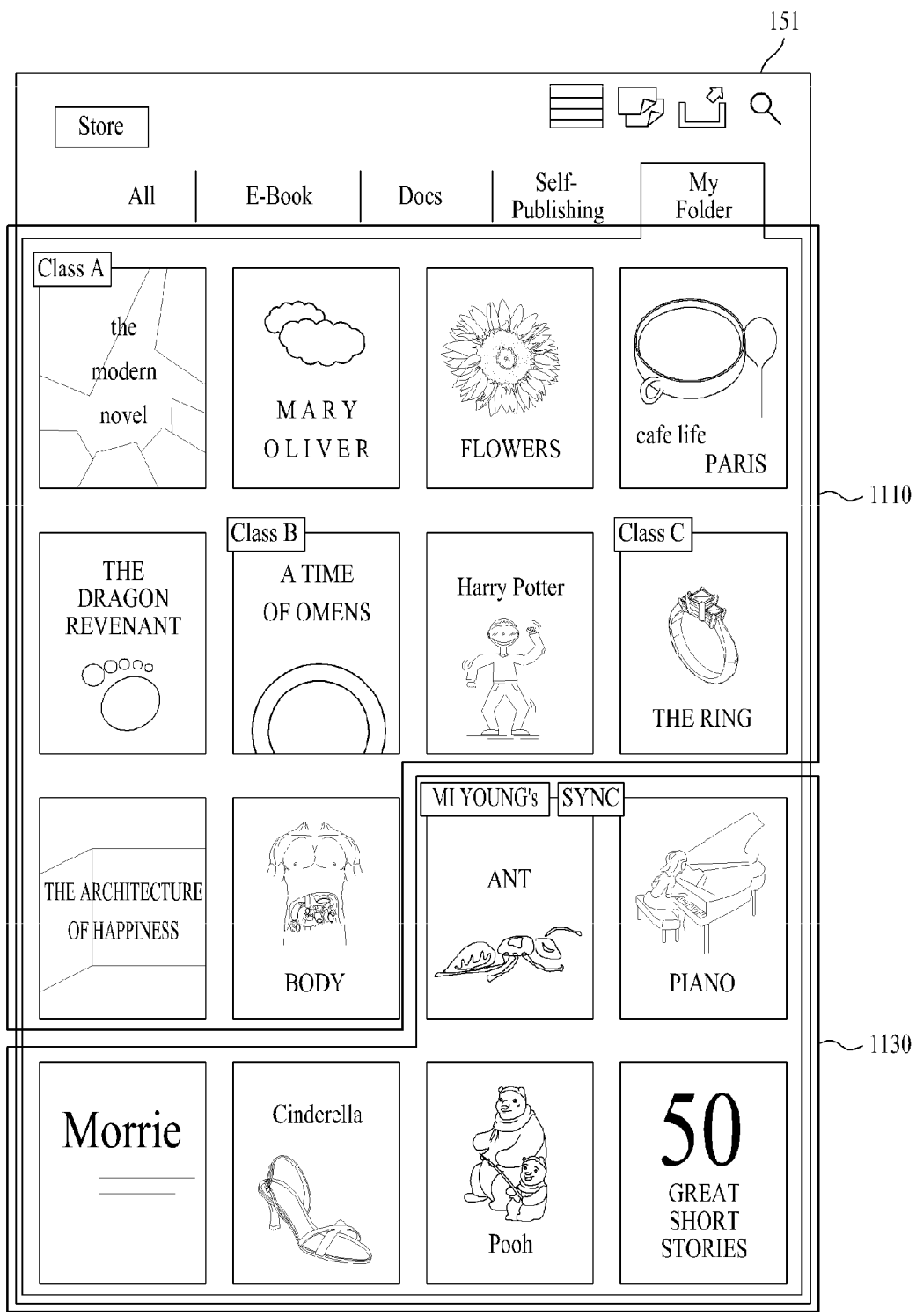
FIG. 11 is a display screen of the touch screen including a list of e-books in the mobile terminal in accordance with one embodiment of the present invention.

As shown in FIG. 11, when a list of e-books retained in the mobile terminal 100 and/or e-books retained by other users is displayed on the touch screen 151, an icon corresponding to each of the e-books can be configured as a book cover appearing on a bookshelf. The e-books retained in the mobile terminal 100 refer to e-books stored as files in the memory 160 and conceptual e-books, the content of which can be instantly retrieved online by accessing an external device, Website, or server via the wireless communication unit 110.

FIG. 11 is a display screen of the touch screen 151 including a list of e-books in the mobile terminal 100 in accordance with one embodiment of the present invention. In the embodiment of FIG. 11, it is assumed that the mobile terminal 100 has previously exchanged e-book related information with another user, identified as "Mi Young" for example, of another mobile terminal.

In FIG. 11, an e-book list is displayed by arranging e-book icons that appear as books on a bookshelf. Each e-book icon on the bookshelf can represent a single copy of a corresponding e-book. When a prescribed e-book icon is selected from a number of the e-book icons arranged on the bookshelf, a reading mode for the e-book corresponding to the selected e-book icon can be executed by the mobile terminal 100.

As shown in FIG. 11, e-books retained by the mobile terminal 100 are arranged as e-book icons in a top region

1110, while e-book icons of e-books retained by the user "Mi Young" are arranged in a bottom region 1130. In order to facilitate identification of users, a partition (not shown in the drawing) can be displayed on a boundary between e-book icons of different users, and a user's name can be displayed on a first e-book icon retained by a corresponding user.

When an e-book retained by the mobile terminal 100 is the same as an e-book retained by a different user, only a single e-book icon of the same e-book can be displayed on the bookshelf. For example, the e-book icon of the same e-book is only displayed in the region that includes the e-book icons retained by the mobile terminal 100, such as the top region 1110. In such a case, a visual effect, such as user name, user identification (ID), user phone number, or a user mail address, for indicating the different user retaining the same e-book can be applied to the e-book icon of the same e-book.

Figure 12A:
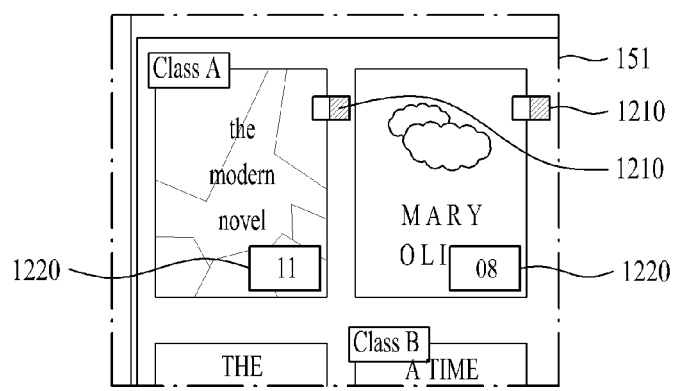
FIGS. 12A through 12C are portions of display screens of the touch screen displaying bookmark information in a bookshelf type e-book list in the mobile terminal in accordance with one embodiment of the present invention.
Figure 12B:
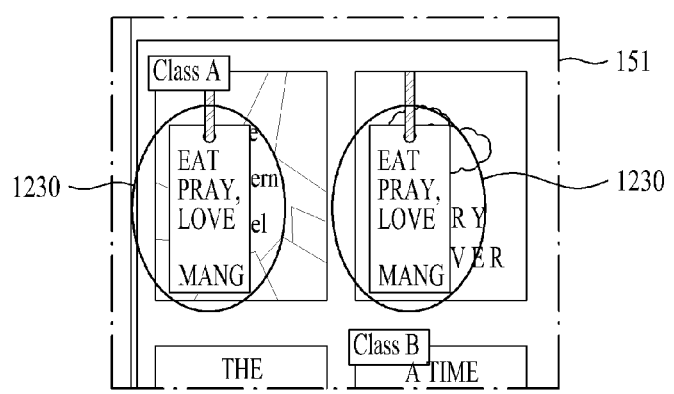
Figure 12C:
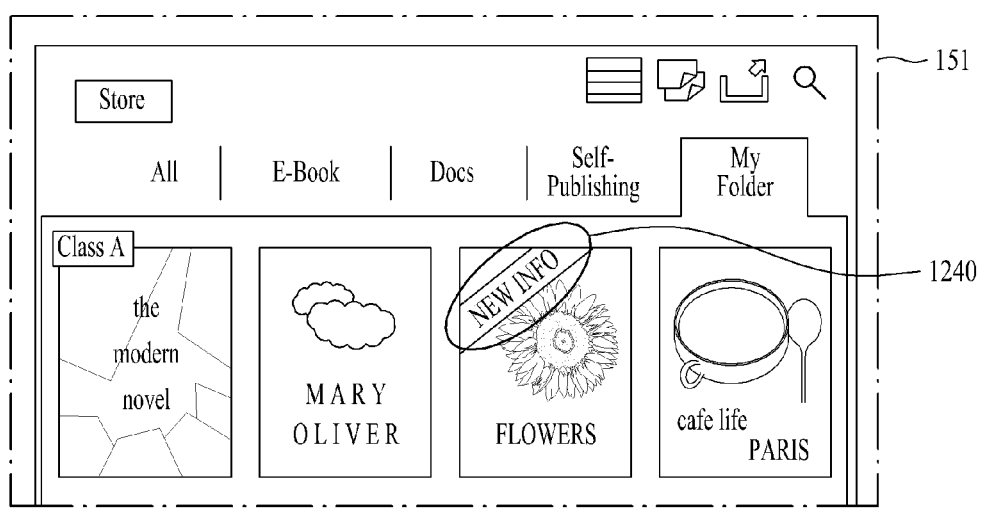

As discussed with reference to FIGS. 12A through 12C, the previously discussed bookmark information of the first and second type bookmarks can also be displayed on the bookshelf type e-book list shown in FIG. 11. FIGS. 12A through 12C are portions of display screens of the touch screen 151 displaying bookmark information in a bookshelf type e-book list in the mobile terminal 100 in accordance with one embodiment of the present invention.

As shown in FIG. 12A, a first type bookmark icon 1210 can be displayed on a right top edge of each e-book icon arranged in the bookshelf type e-book list. The number of bookmarks 1220 of the first type bookmarks can be displayed on a right bottom side of each e-book icon. In such a case, the first type bookmark icon 1210 can be displayed or no longer displayed when a user applies a drag or flicking touch input in a horizontal direction on the corresponding e-book icon.

As shown in FIG. 12B, a second type bookmark icon 1230 can be displayed on each e-book icon arranged in the bookshelf type e-book list. The second type bookmark icon 1230 can be reduced in size relative to the second type bookmark icon described with reference to FIGS. 8A and 8B. Information indicated by a bookmark, such as a page, chapter, and the time and date on which the bookmark was generated, can be displayed on the corresponding second type bookmark icon 1230. In such a case, the second type bookmark icon 1230 can be displayed or no longer displayed when a user applies a drag or flicking touch input in a vertical direction on the corresponding e-book icon.

When a number of bookshelves extending in horizontal and/or vertical directions are provided, the bookshelves can be scrolled via a flicking touch input to enable viewing of the portions of the bookshelves that exceed the displayable area of the touch screen 151. Therefore, the touch input for scrolling the bookshelves must be distinguished from a touch input for displaying a bookmark. Accordingly, the controller 180 is configured to recognize a touch input for displaying the bookmark only when a trace of a drag or flicking touch input is detected within an e-book icon.

The bookmark information displays of the types described with reference to FIGS. 12A and 12B can be applied to both the e-books retained by the mobile terminal 100 and the e-books retained by a different user. When latest e-book related information of a different user is received, the controller 180 compares the latest e-book related information to previously received e-book related information of the different user. When the controller 180 finds new information as a result of the comparison, such as a newly added bookmark or a highlight and note, the controller 180 provides a visual effect 1240 on a corresponding e-book icon to indicate that there is new information to be displayed.

The visual effect 1240 can be displayed on the e-book icon situated in the region of the bookshelf that includes e-books retained by the different user. However, if the e-book is the same as an e-book retained by the mobile terminal 100, the visual effect 1240 can be displayed on an e-book icon situated in the region of the bookshelf that includes e-books retained by the mobile terminal 100.

When the visual effect 1240 indicating the presence of new information is selected, a list of the newly added information can be directly displayed. If a bookmark is added to an e-book, added information can be displayed in a manner similar to FIGS. 10A through 10D in accordance with a type of the added bookmark.

Figure 13A:
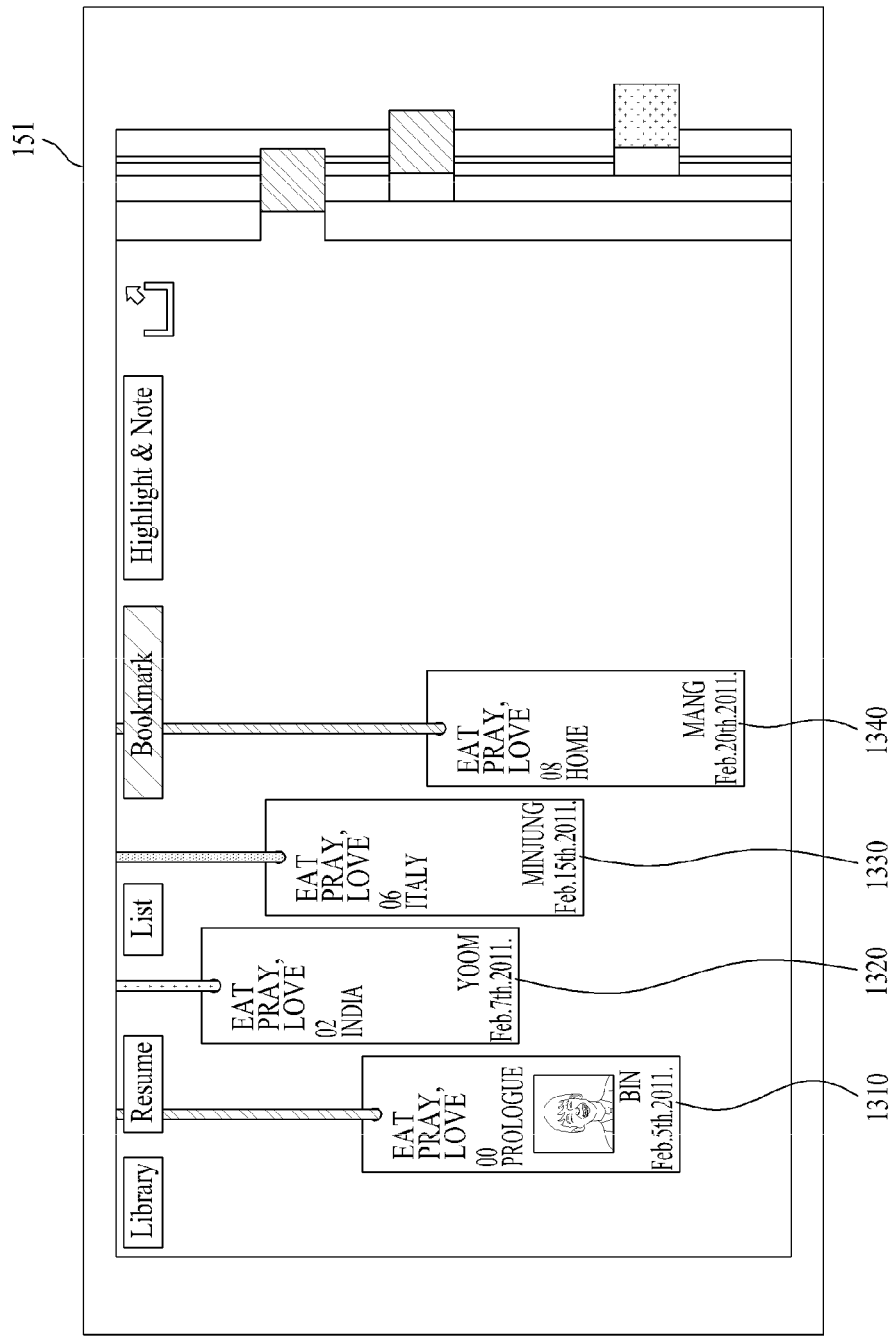
FIG. 13A is a display screen of the touch screen showing one example of collecting and reading second type bookmark icons set by a different user in mobile terminal in accordance with one embodiment of the present invention.

When an e-book retained by the mobile terminal 100 is the same as an e-book retained by a different user and when second type bookmark icons are set on both of the same e-books, the second type bookmark icons of the mobile terminal 100 and the different user can be collectively read as described with reference to FIG. 13A. FIG. 13A is a display screen of the touch screen 151 showing one example of collecting and reading second type bookmark icons set by a different user in mobile terminal 100 in accordance with one embodiment of the present invention.

In the embodiment of FIG. 13A, it is assumed that the user of the mobile terminal 100 and three different users of corresponding mobile terminals retain the same e-book. It is further assumed that each of the users sets a second type bookmark icon and the mobile terminal 100 obtains information about the second type bookmark icon settings.

As shown in FIG. 13A, when a bookmark icon of the type shown in FIG. 12B is displayed on an e-book retained by the mobile terminal 100 and by different users of mobile terminals, the second type bookmark icons 1310, 1320, 1330 and 1340 set by the users retaining the same e-book can be displayed when the bookmark icon of the type shown in FIG. 12B is selected. For example, either all the second type bookmark icons 1310, 1320, 1330 and 1340 set by the different users can be displayed or only the last second type bookmark icons set by each of the users can be displayed.

Information for identifying a user, a date when the second type bookmark icon was generated, a chapter, and a page can be displayed on each of the second type bookmark icons 1310, 1320, 1330 and 1340, which can be sorted according to at least one of such items of information. For example, the information for identifying a user can include a name, a mail address, a phone number, or an ID. In the embodiment of FIG. 13A, the second type bookmark icons 1310, 1320, 1330 and 1340 are sorted according to the order of chapters.

A page indicated by a corresponding bookmark can be displayed when a prescribed second type bookmark icon is selected from among the displayed second type bookmark icons 1310, 1320, 1330 and 1340. When a second type bookmark icon of a different user is dragged in a vertical direction, instead of a second type bookmark icon of the user of the mobile terminal 100, a bookmark list of first type bookmarks set by the corresponding different user can be displayed, which is described with reference to FIG. 13B.

Figure 13B:
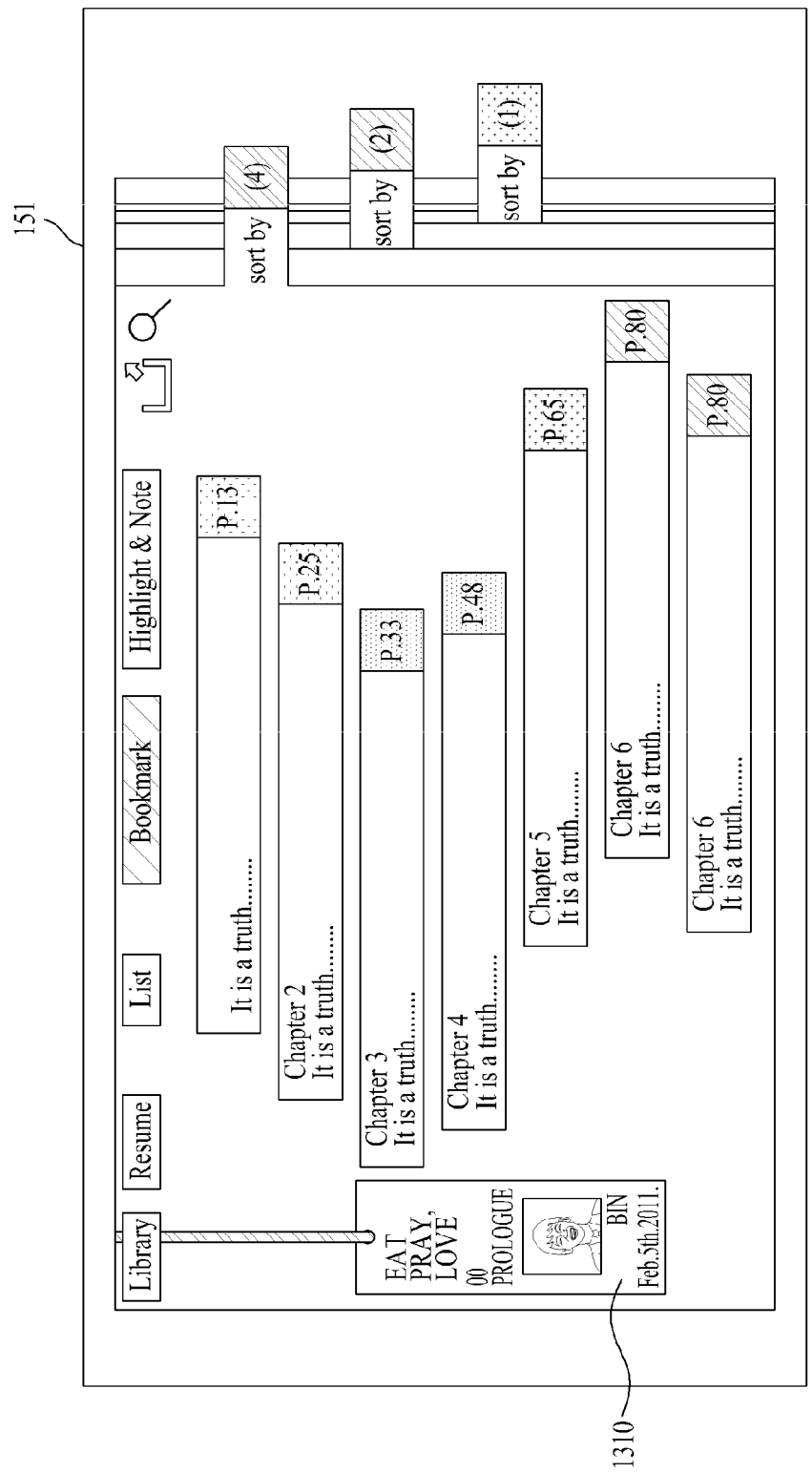
FIG. 13B is a display screen of the touch screen showing one example of displaying a bookmark list of first type bookmarks set by the different user in response to a selection of a second type bookmark icon set by the different user in the mobile terminal in accordance with one embodiment of the present invention.

FIG. 13B is a display screen of the touch screen 151 showing one example of displaying a bookmark list of first type bookmarks set by the corresponding different user in response to a selection of a second type bookmark icon set by the corresponding different user in the mobile terminal 100 in accordance with one embodiment of the present invention.

In the embodiment of FIG. 13B, it is assumed that a second type bookmark icon 1310 set by the user named "BIN" in FIG. 13A has been selected. Accordingly, the selected second type bookmark icon 1310 is displayed on a prescribed edge of the touch screen 151 and a bookmark list of first type bookmarks set by the user "BIN" is displayed on a center of the touch screen 151. Since the bookmark list of first type bookmarks of FIG. 13B is similar to the previously described bookmark list of first type bookmarks of FIG. 10C, the description of the bookmark list of first type bookmarks of FIG. 13B is omitted to maintain brevity.

The previously described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The aforementioned embodiments of a mobile terminal capable of performing the e-book bookmark function and controlling method of a mobile terminal may be achieved by a combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A mobile terminal comprising:
 a touch screen configured to display an e-book comprising one or more pages;
 a communication module configured to exchange data with at least one external device via a wired or wireless connection; and
 a controller configured to:
  set a bookmark on a selected page of the one or more pages when a touch input applied in a touch direction from an inner portion of the selected page toward an outer portion of the selected page is detected; and
  cause the touch screen to display a first type bookmark icon or a second type bookmark icon corresponding to the bookmark set on the selected page according to the touch direction of the touch input,
 wherein when the touch direction of the applied touch input is a first direction, the first type bookmark icon is displayed,
 wherein when the touch direction of the applied touch input is a second direction, the second type bookmark icon is displayed,
 wherein the first type bookmark icon is a content-based bookmark, which indicates a specific page or a range of content of the e-book,
 wherein the second type bookmark icon includes at least information about a user of the mobile terminal, and
 wherein the controller is further configured to:
  receive information about at least one second type bookmark generated by at least one user of an external mobile terminal, the received information including information for identifying the at least one user of the external mobile terminal;
  cause the touch screen to display a plurality of second type bookmark icons comprising at least one second type bookmark icon associated with the at least one user of the external mobile terminal and corresponding to the received information and the second type bookmark icon associated with the user of the mobile terminal;
  recognize selection of one second type bookmark icon among the plurality of second type bookmark icons; and
  cause the touch screen to display the selected second type bookmark icon together with at least one first type bookmark information previously set by a user corresponding to the selected second type bookmark icon.

2. The mobile terminal of claim 1, wherein the controller is further configured to generate and display the first type bookmark icon on an edge of the selected page in a substantially horizontal manner.

3. The mobile terminal of claim 1, wherein at least one portion of the first type bookmark icon is displayed outside the selected page.

4. The mobile terminal of claim 1, wherein the controller is further configured to cause the touch screen to display a window including selectable items for changing at least a color, a pattern, or a type of at least one portion of the first type bookmark icon when the first type bookmark icon is selected.

5. The mobile terminal of claim 1, wherein the first type bookmark icon is at least an index tab, a flag, a detachable memo paper, or an attachable bookmark.

6. The mobile terminal of claim 1, wherein the controller is further configured to cause the touch screen to display a range setting object on the selected page for specifying content to be indicated by the first type bookmark icon when the touch input is detected and when the touch direction of the touch input is the first direction.

7. The mobile terminal of claim 1, wherein the controller is further configured to cause the touch screen to consecutively display at least one page following the selected page while the touch input is applied until the touch input is completed to generate the first type bookmark icon for each of the at least one page following the selected page when the touch direction of the touch input is the first direction.

8. The mobile terminal of claim 1, wherein the controller is further configured to generate the first type bookmark icon for the selected page and at least one page following the selected page as a unit in proportion to a period of time it takes to complete the touch input when the touch direction of the touch input is the first direction.

9. The mobile terminal of claim 8, wherein the controller is further configured to cause the touch screen to sequentially display the at least one page following the selected page at a predetermined speed during the period of time.

10. The mobile terminal of claim 1, wherein
 the second type bookmark icon further includes at least table of contents information corresponding to the selected page or information indicating a time at which the second type bookmark icon was generated.

11. The mobile terminal of claim 10, wherein:
 the controller is further configured to enter a collective reading mode for displaying at least one previously generated bookmark icon and to cause the touch screen to display at least one partial region of the e-book on the touch screen when a specific command is received via the touch screen;

at least one previously generated first type bookmark icon is displayed in a first region of the at least one partial region; and at least one previously generated second type bookmark icon is displayed in a second region of the at least one partial region.

12. The mobile terminal of claim 11, wherein:
the at least one bookmark previously set by the user of another mobile terminal includes at least a name of the user of another mobile terminal, a current page, or a date.

13. The mobile terminal of claim 11, wherein the at least one partial region of the e-book is a partial region of a page displayed on the touch screen before a cover of the e-book or before the specific command is recognized.

14. The mobile terminal of claim 11, wherein:
the first region comprises a right edge of the at least one partial region of the e-book; and
the second region comprises a bottom side of the at least one partial region of the e-book.

15. The mobile terminal of claim 11, wherein the controller is further configured to cause the touch screen to:
display a list of bookmarks on the touch screen that correspond to the first type bookmark icon among the at least one previously generated bookmark icon when the first region is selected in the collective reading mode; and
display a list of bookmarks on the touch screen that correspond to the second type bookmark icon among the at least one previously generated bookmark icon when the second region is selected in the collective reading mode.

16. The mobile terminal of claim 15, wherein:
the first region is selected via a drag or flicking touch input applied in a substantially horizontal direction on the first region; and
the second region is selected via a drag or flicking touch input applied in a substantially vertical direction on the second region.

17. The mobile terminal of claim 10,
wherein the controller is further configured to
cause the touch screen to display the shared information such that the shared information is sorted according to at least the table of contents information, the information about the user of the mobile terminal, or the information indicating the time at which the second type bookmark icon was generated.

18. The mobile terminal of claim 1, wherein the controller is further configured to execute a shortcut to the selected page when the first type bookmark icon or the second type bookmark icon on the selected page is selected via a touch input.

19. The mobile terminal of claim 1, wherein the controller is further configured to no longer display the first type bookmark icon or the second type bookmark icon when a touch input applied at a prescribed point on the selected page is detected having a touch direction from an outer portion of the selected page toward an inner portion of the selected page.

20. A method of controlling a mobile terminal comprising a touch screen, the method comprising:
displaying an e-book comprising one or more pages on the touch screen;
detecting a touch input applied on the touch screen in a touch direction from an inner portion of a selected page of the one or more pages toward an outer portion of the selected page;
setting a bookmark on the selected page; and
displaying a first type bookmark icon or a second type bookmark icon corresponding to the bookmark set on the selected page according to the touch direction of the touch input,
wherein when the touch direction of the applied touch input is a first direction, the first type bookmark icon is displayed,
wherein when the touch direction of the applied touch input is a second direction, the second type bookmark icon is displayed,
wherein the first type bookmark icon is a content-based bookmark, which indicates a specific page or range of content of the e-book, and
wherein the second type bookmark icon includes at least information about a user of the mobile terminal;
receiving information about at least one second type bookmark generated by at least one user of an external mobile terminal, the received information including information for identifying the at least one user of the external mobile terminal;
displaying a plurality of second type bookmark icons comprising at least one second type bookmark icon associated with the at least one user of the external mobile terminal and corresponding to the received information and the second type bookmark icon associated with the user of the mobile terminal;
recognizing selection of one second type bookmark icon among the plurality of second type bookmark icons; and
displaying the selected second type bookmark icon together with at least one first type bookmark information previously set by a user corresponding to the selected second type bookmark icon.

21. The method of claim 20, wherein the first type bookmark icon is generated and displayed on an edge of the selected page in a substantially horizontal manner.

22. The method of claim 20,
wherein the second type bookmark icon further includes at least table of contents information corresponding to the selected page or information indicating a time at which the second type bookmark icon was generated.

* * * * *